(12) United States Patent
Newton et al.

(10) Patent No.: US 11,873,205 B2
(45) Date of Patent: Jan. 16, 2024

(54) TOUCHLESS AND DATA MANAGEMENT DRINK DISPENSING DEVICE

(71) Applicants: John Newton, Vero Beach, FL (US); Peter Brooke, Micco, FL (US); Jacob Lockwood, Vero Beach, FL (US); Dustin Hartsfield, Sebastian, FL (US); Michael Cheney, Vero Beach, FL (US); Gillian Callaghan, Vero Beach, FL (US); Rory Pawl, West Bloomfield, MI (US)

(72) Inventors: John Newton, Vero Beach, FL (US); Peter Brooke, Micco, FL (US); Jacob Lockwood, Vero Beach, FL (US); Dustin Hartsfield, Sebastian, FL (US); Michael Cheney, Vero Beach, FL (US); Gillian Callaghan, Vero Beach, FL (US); Rory Pawl, West Bloomfield, MI (US)

(73) Assignee: GATE CFV Solutions, Inc., Sebastian, FL (US)

(*) Notice: Subject to any disclaimer, the term of this patent is extended or adjusted under 35 U.S.C. 154(b) by 0 days.

(21) Appl. No.: 17/476,849

(22) Filed: Sep. 16, 2021

(65) Prior Publication Data
US 2022/0081277 A1 Mar. 17, 2022

Related U.S. Application Data

(60) Provisional application No. 63/079,631, filed on Sep. 17, 2020.

(51) Int. Cl.
*B67D 1/12* (2006.01)
*G06Q 10/0875* (2023.01)
*B67D 1/08* (2006.01)

(52) U.S. Cl.
CPC ......... *B67D 1/1281* (2013.01); *B67D 1/0888* (2013.01); *G06Q 10/0875* (2013.01)

(58) Field of Classification Search
CPC .......... B67D 7/00; B67D 1/12; B67D 1/0888; B67D 1/1202; B67D 1/1277; B67D 1/1281
See application file for complete search history.

(56) References Cited

U.S. PATENT DOCUMENTS

| 8,322,570 B2* | 12/2012 | Beavis | A47J 31/40 |
| | | | 222/145.5 |
| 10,364,136 B2* | 7/2019 | Newton | B67D 1/1466 |
| 10,618,795 B2* | 4/2020 | Newton | B67D 1/0075 |
| 10,664,132 B2* | 5/2020 | Broen | G06F 3/011 |
| 2017/0088410 A1* | 3/2017 | Wing | B67D 1/0022 |

* cited by examiner

*Primary Examiner* — Timothy L Maust
(74) *Attorney, Agent, or Firm* — CF3; Stepaen Eisenmann

(57) ABSTRACT

A drink dispensing device including one or more processors, a drink dispensing item located above a drink container positioning area, and a first sensor to determine when a drink container is located in the drink container positioning area, where the one or more processors initiate a drink container filling operation based on a first signal from the first sensor that the drink container is located in the drink container positioning area.

11 Claims, 24 Drawing Sheets

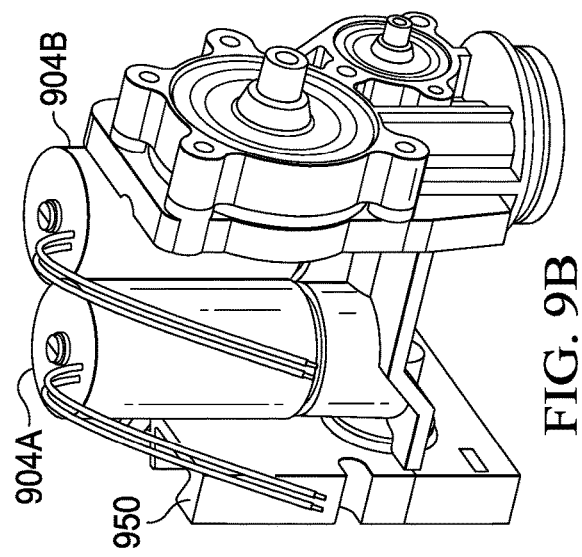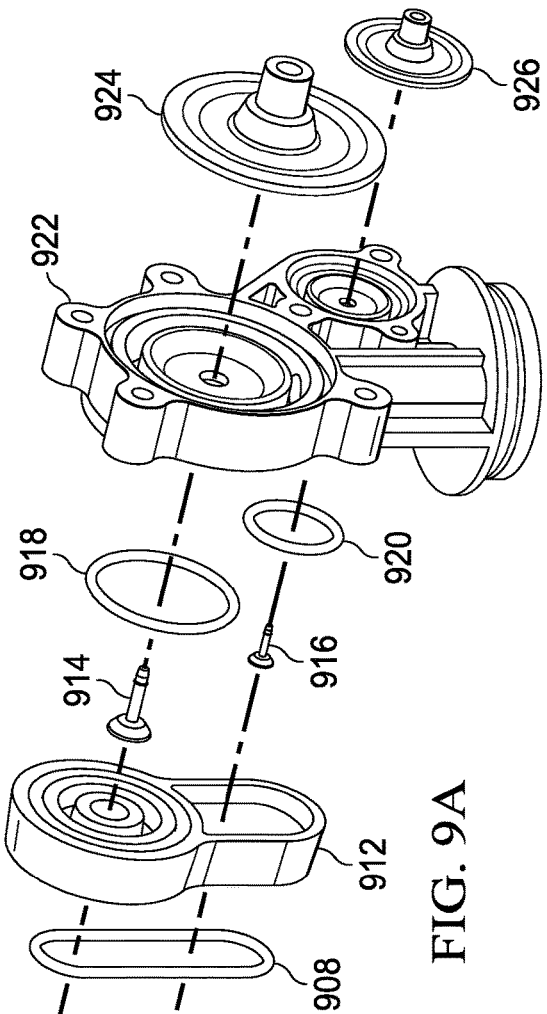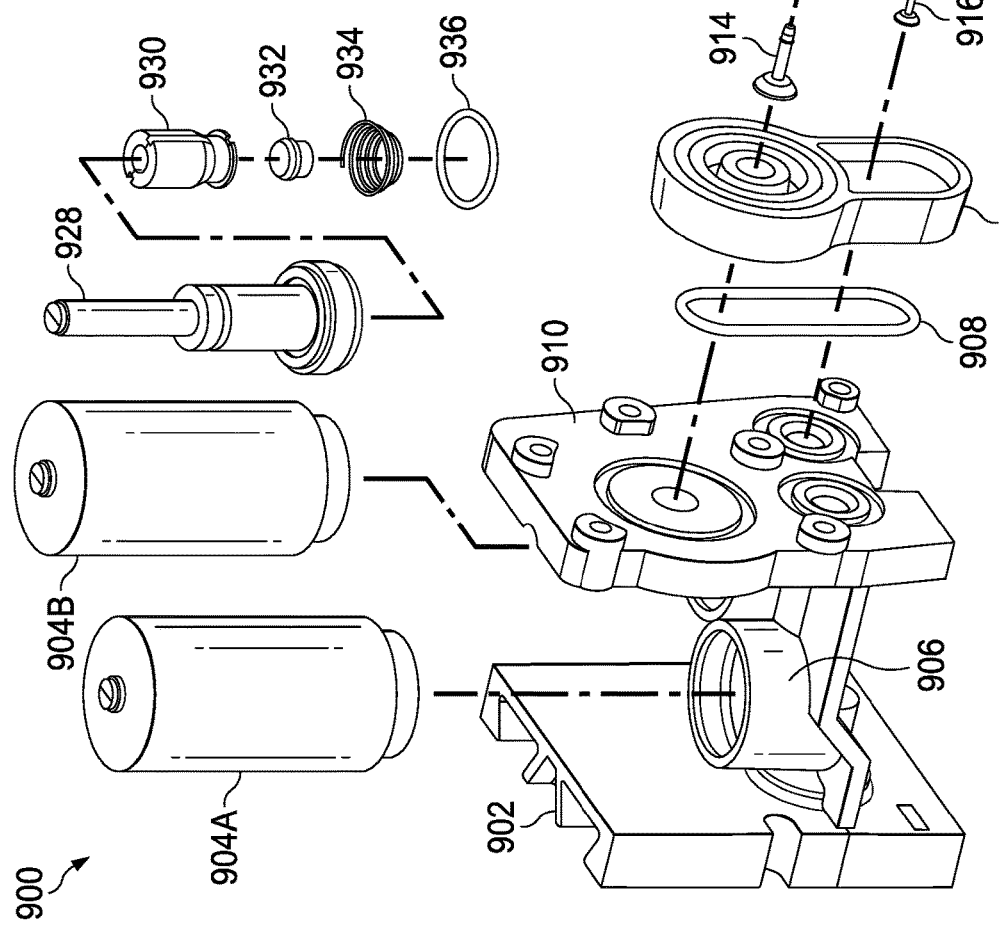

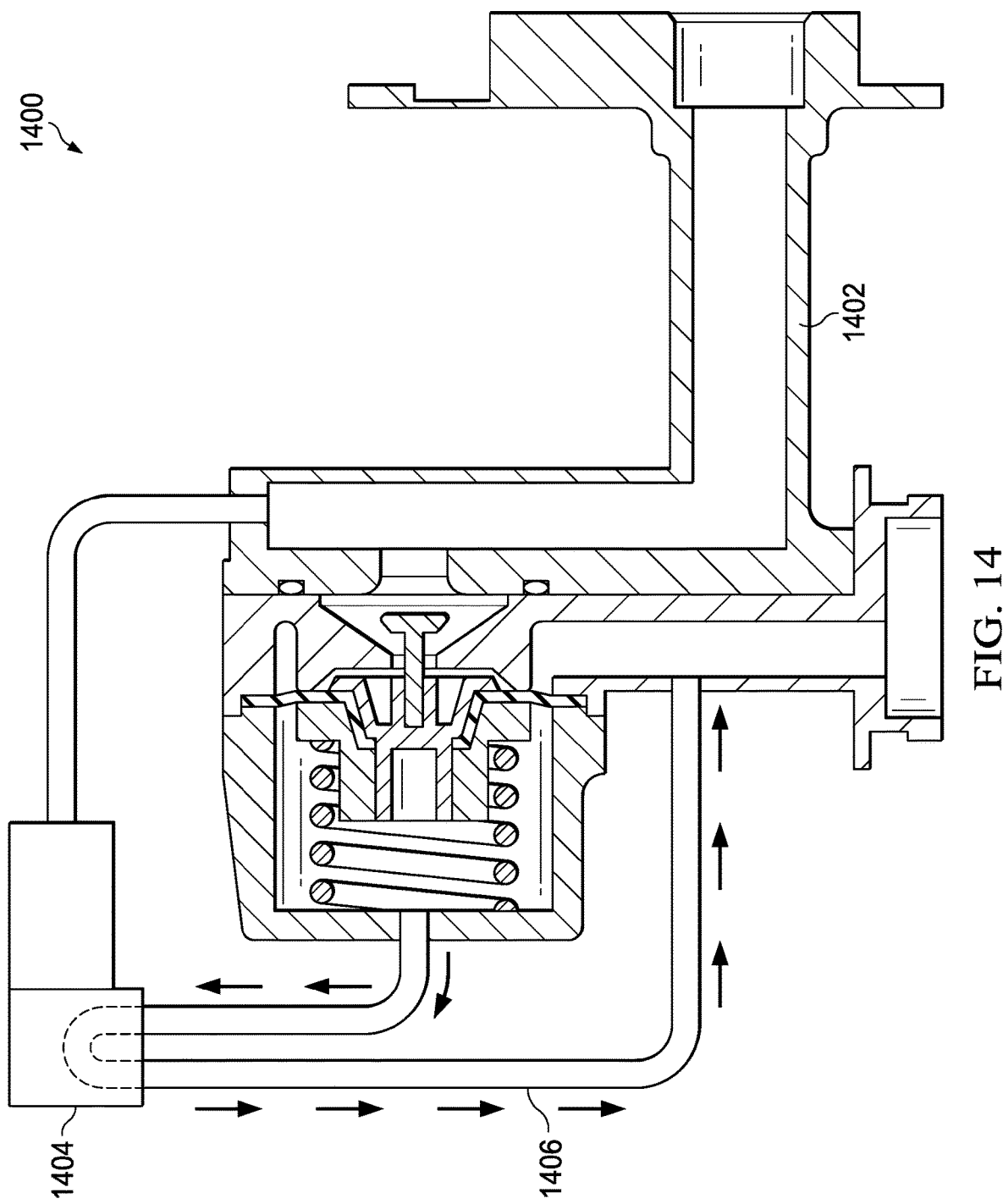

US 11,873,205 B2

TOUCHLESS AND DATA MANAGEMENT DRINK DISPENSING DEVICE

REFERENCE TO RELATED APPLICATION

The present application claims priority to Provisional Patent Application No. 63/079,631 filed Sep. 17, 2020. All of the above-referenced patent applications are incorporated in their entirety by reference.

BACKGROUND DISCUSSION

In the field, there are several million soft drink "discrete dispensing valves" that are activated by the customer touching a button or pushing on a lever arm by hand or the lip/edge of the cup. In either case there is a transfer (e.g., germs, particles, fluids, etc.) from the customers to the machine surface during these transactions. Unfortunately, it could be hundreds or thousands of contacts before the machine is cleaned or sanitized.

In addition, there is no way for the syrup supplier to know how much syrup was dispensed. In some cases, the store will cut the syrup ratio to save money on the syrup cost or even use an un-branded imitation syrup altogether. Since there is no connection to the syrup used and the machine rental agreement, it can cost the syrup suppler considerable money as well as serving a sub-par drink.

FIELD OF THE DISCLOSURE

This disclosure relates generally to liquid delivery systems, and is concerned in particular with monitoring dispensing data and/or providing a clean, touch-free dispensing environment.

SUMMARY OF THE DISCLOSURE

The Newton CFV touchless discrete dispensing valve eliminates the customer touching feature and senses the cup being in position before starting the pour. When the customer pulls the cup away the sensor shuts off the flow. In accordance with one aspect of the present disclosure, a liquid dispensing system including a contactless function is described.

The CFValves in the discrete device cause the flow to be exact according to the required mixed ratio pressure/flow rate of the syrup/drink being poured (i.e. the exact ratio/flavor). The sensor that turns the flow on and off also counts the time that the syrup [at the fixed ratio] is flowing and the information is stored and/or transmitted to one or more remote devices. Thus, the syrup supplier may know the status of the inventory at the syrup supplier's customers' locations at any given time. If there is a bulge in inventory per X number of ounces of syrup dispensed then the system will indicate that a syrup supplier's customer is using a substitute. In the major brand locations where substitution of products is rare it allows the inventory control to be in real time, greatly enhancing customer service and cost saving delivery schedules.

In accordance with one aspect of the present disclosure, angles may be adjustable. In accordance with one aspect of the present disclosure, the on function may have a customized display. In accordance with one aspect of the present disclosure, the off function may be a crisp and/or sudden function. In accordance with one aspect of the present disclosure, a second sensor may be included to show when the cup is full so that it becomes more sensitive when the cup is filling. In accordance with one aspect of the present disclosure, a moving average may be utilized with a first window for the cup and a second timeframe, so when it is moving it can sense the cup is moving. In accordance with one aspect of the present disclosure, a screen may also provide instructions to the customer. In accordance with one aspect of the present disclosure, a pressurized liquid may be introduced into a T-fitting in the chamber. The T-fitting has one branch communicating with the third conduit and another branch communicating with the chamber.

BRIEF DESCRIPTION OF THE DRAWINGS

FIG. 9A is an illustration of a discrete CF Valve, according to one embodiment.

FIG. 9B is an illustration of a discrete CF Valve, according to one embodiment.

FIG. 14 is another illustration of a Non-Electric-Mechanical discrete CF Valve, according to one embodiment.

DETAILED DESCRIPTION

Figure 1A:
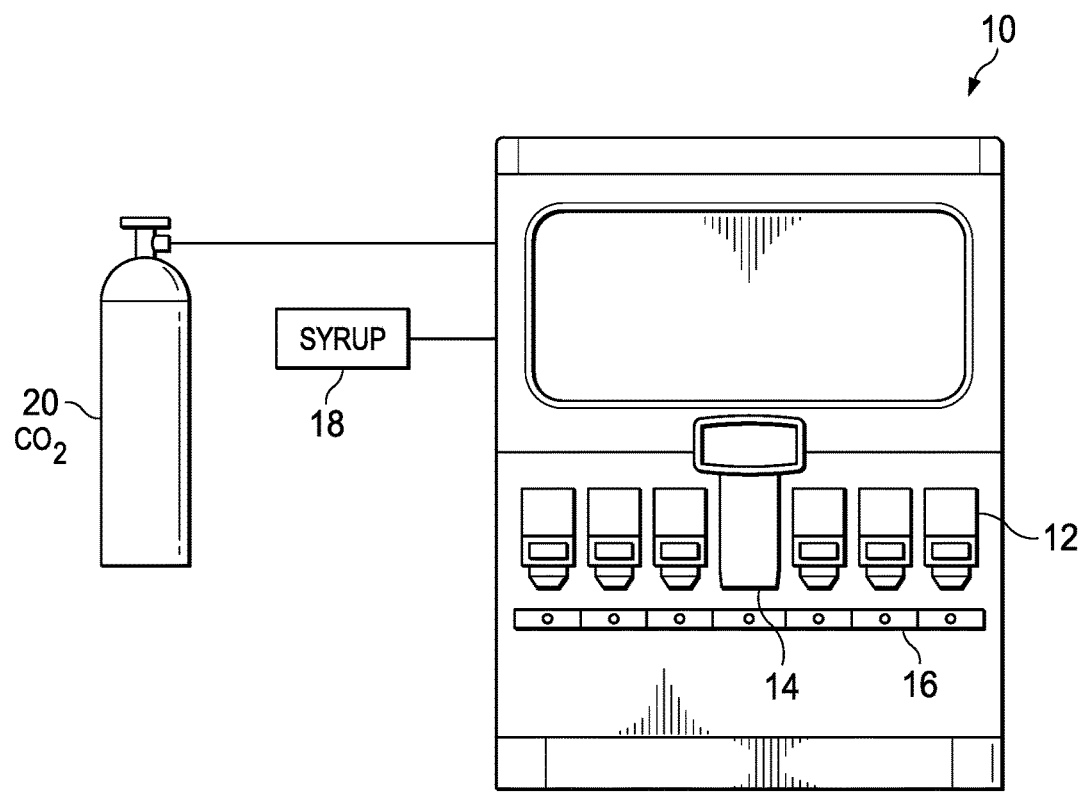
FIG. 1A is a diagrammatic illustration of a liquid delivery system.
Figure 1B:
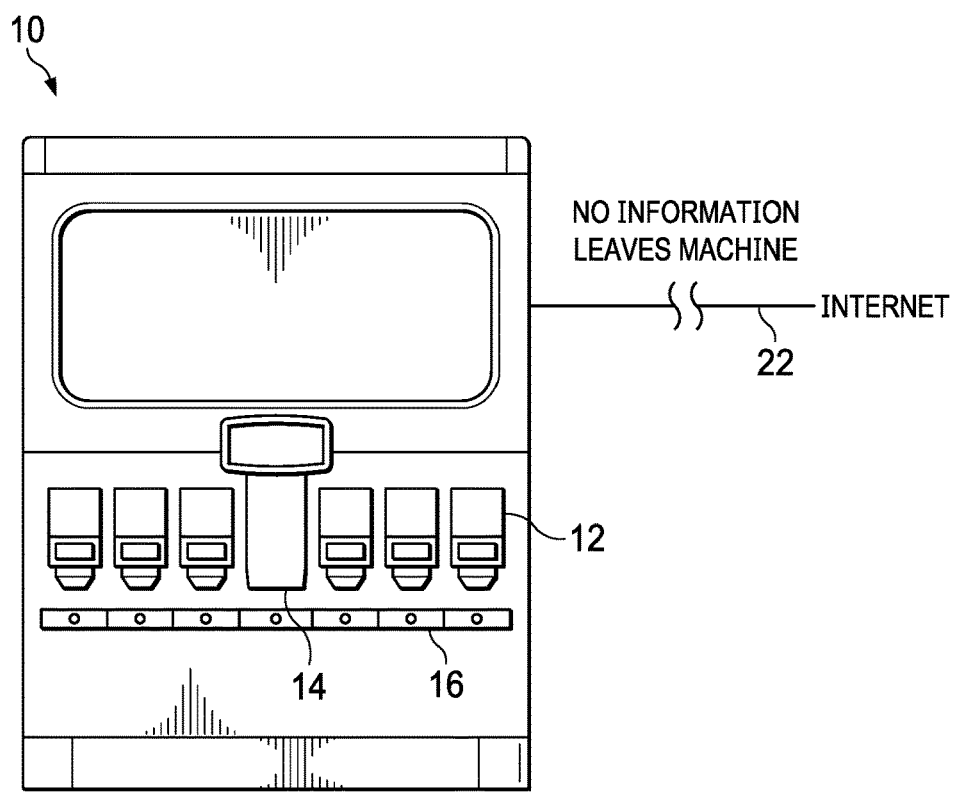
FIG. 1B is a diagrammatic illustration of a liquid delivery system.

In FIG. 1A, an illustration of a liquid delivery system is shown. FIG. 1A shows a ceramics-based dispensing system 10. The ceramics-based dispensing system 10 includes one or more dispensing areas 12, an ice dispensing area 14, one or more push controls 16, one or more syrup units 18, and one or more CO2 units 20 (or water units). The ceramics-based dispensing system 10 does not communicate with the internet 22 (FIG. 1B). Further, even if the ceramics-based dispensing system 10 could communicate with the internet 22, the information received from the ceramics-based dispensing system 10 would have significant inaccuracies because there is no data collection function.

Figure 2A:
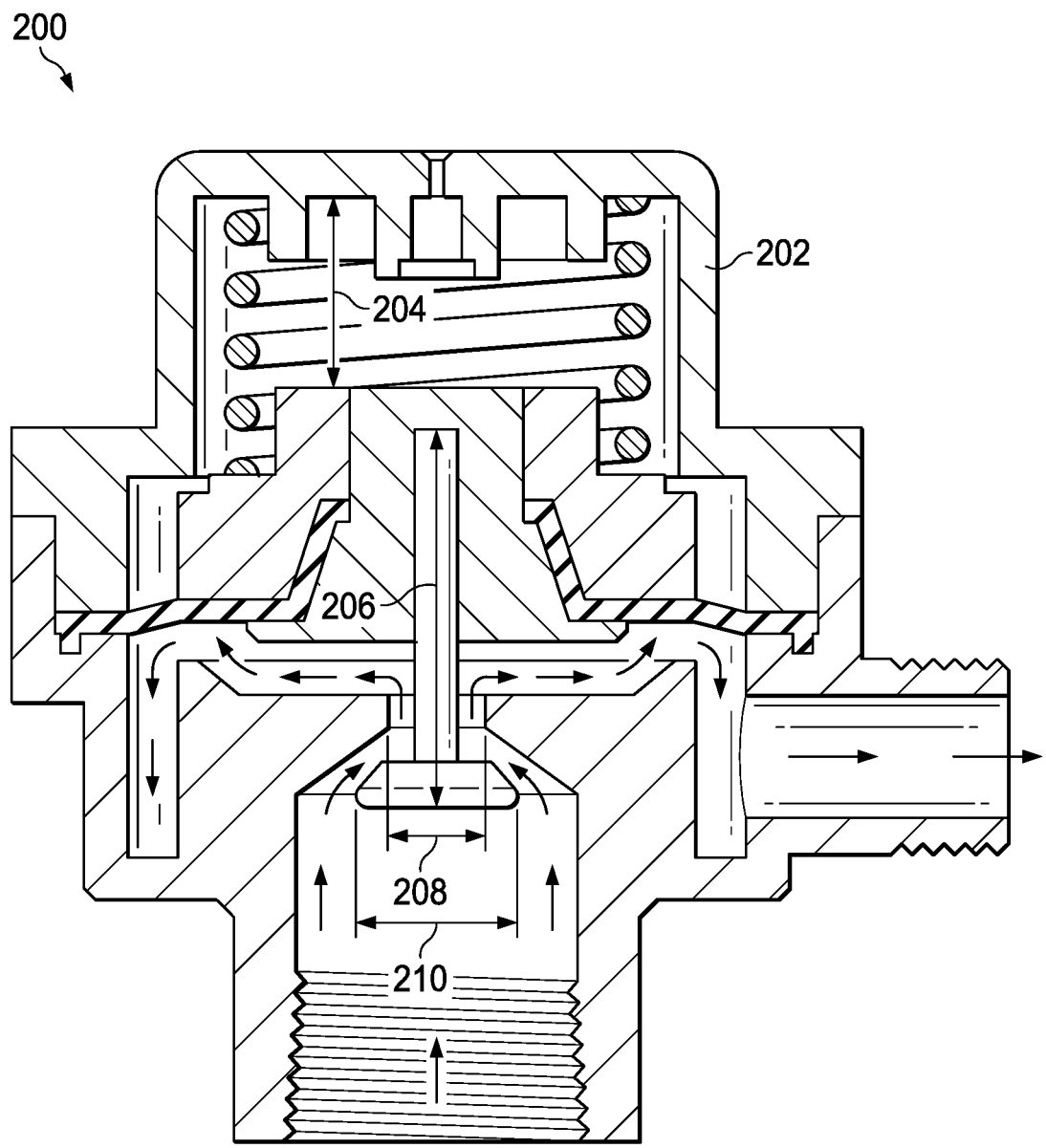
FIG. 2A is an illustration of a CF Valve, according to one embodiment.

In FIG. 2A, an illustration of a CF Valve system is shown, according to one embodiment. FIG. 2A demonstrates the operations of the CFValve technology, which can precisely control flow rate and pressure. Therefore, accurate accounting may be completed to determine inventory drawl and/or utilization. In other words, based on the amount of time the CFValve is opened and/or operated, one or more calculations can be completed relating to syrup used (e.g., syrup 1 used x units, syrup 2 used y units, etc.), cups sold, etc. For example, based on the information that the CFvalve was open for 10 hours; 3 minutes; and 13 seconds during a first day, the system, device, and/or method may determine that 10,000 units of syrup 1 were used with 40,000 units of CO2 or water. This information can be combined with inventory data to provide a just in time delivery cycle. Further, similar information for a plurality of syrups can determine sales growth relative to each other, which can indicate one or more opportunities and/or issues. In another example, based on information from the CFValve usage, syrup 1 used 300 units whereas syrup 2 used only 80 units. Since syrup 2 performance relative to syrup 1 is outside a historical trend line, one or more actions (e.g., maintenance call, syrup container inspection, on-site marketing visit, etc.) may be taken. A CFValve 200 may include a housing 202, a spring force 204, a throttle pin 206, an inlet orifice 208, and a throttle pin head 210.

Figure 2B:
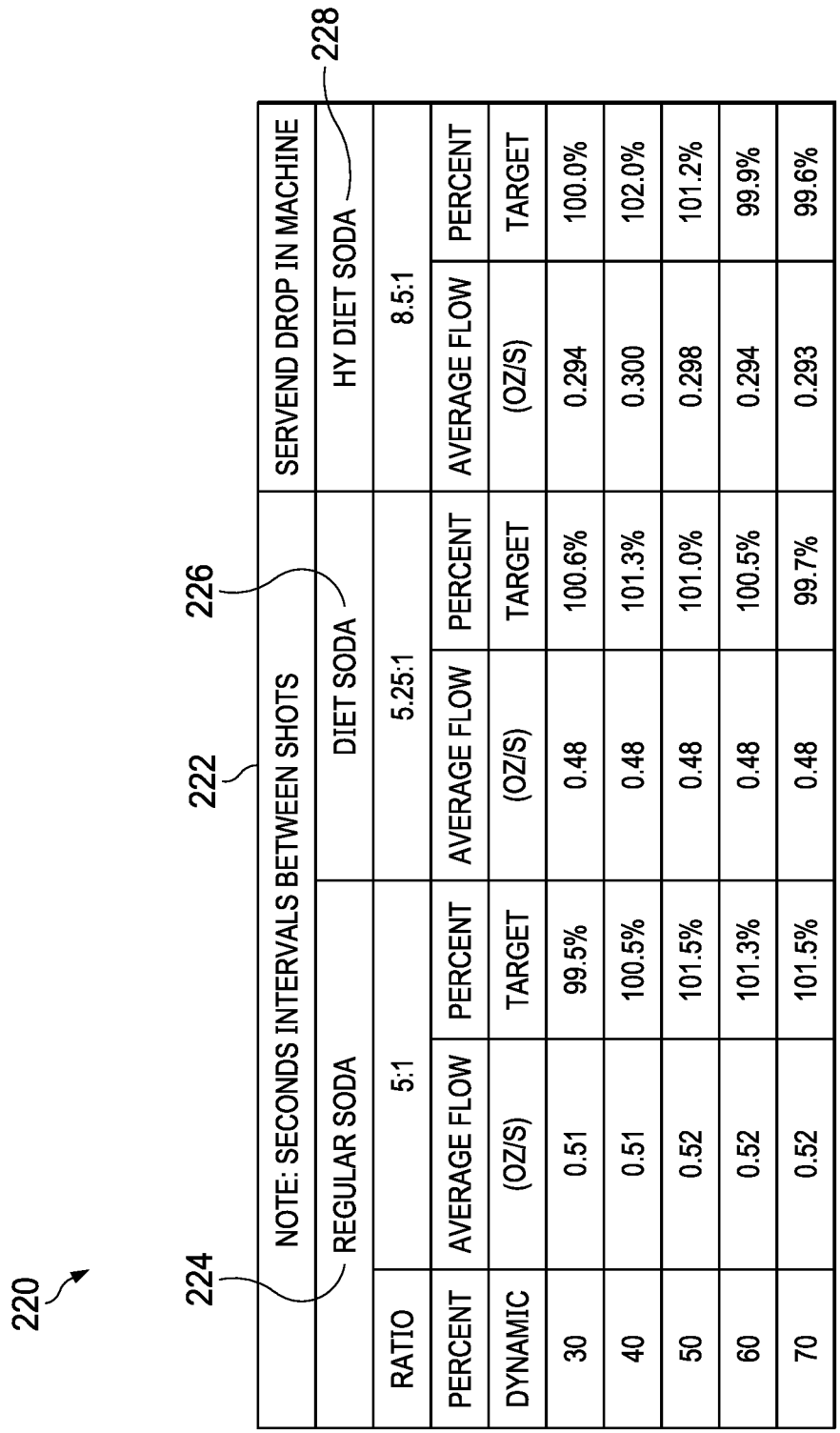
FIG. 2B is an illustration of test results of the CF Valve, according to one embodiment.

In FIG. 2B, an illustration of test results of the CF Valve are shown, according to one embodiment. In these various examples, various pressures (e.g., 30 PSI to 70 PSI) are utilized which results in consistent average flow rates with relatively little movement from the targeted value. Therefore, even with varying pressures the CF Valve delivers consistent flow rate and target values. In this example, test results 220 are shown in a chart 222 where a first product 224, a second product 226, and an Nth product 228 are utilized with various results. In these examples, the target pour was achieved with a maximum plus of 2 percent and a maximum minus of 0.5 percent.

Figure 2C:
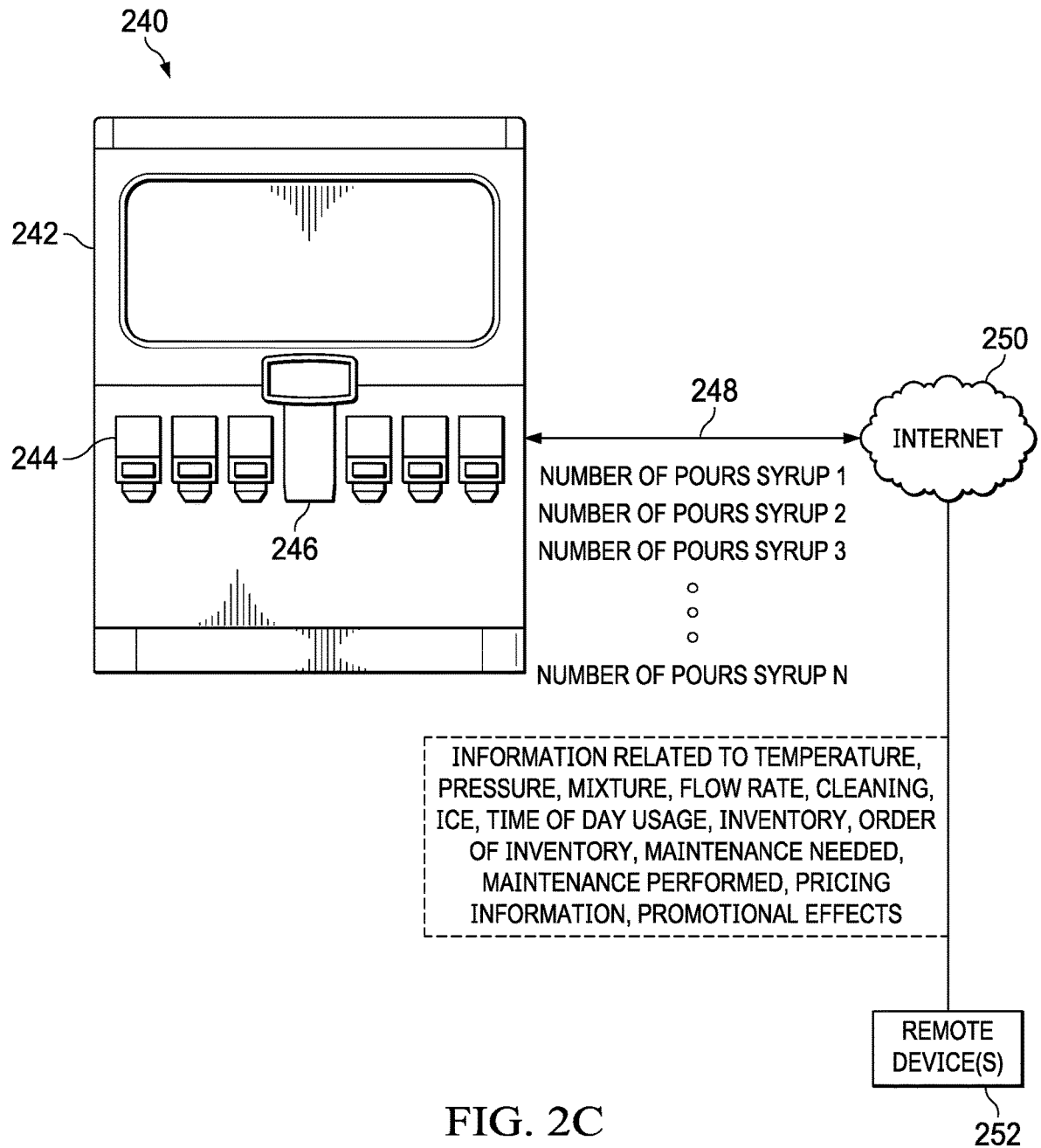
FIG. 2C is a diagrammatic illustration of an exemplary embodiment of a liquid delivery system in accordance with the present disclosure.

In FIG. 2C, an illustration of a liquid delivery system in accordance with the present disclosure is shown. FIG. 2C shows a CFValve dispensing system 240 including one or more processors 242, one or more liquid dispensing areas 244 and an ice dispensing area 246. The CFValve dispensing system 240 may communicate with the Internet 250 and/or one or more remote devices 252 via one or more connects 248 utilizing one or more processors 242 in CFValve dispensing system 240. In various examples, information relating to temperatures, pressures, mixtures, flow rates, cleanings, ice amounts, time of day usage, inventories, orders of inventory, maintenance needed, maintenance completed, pricing information, promotional information, promotional effects, and/or any other data in this disclosure may be communicated to and/or from CFValve dispensing system to and/or from the Internet 22 (and/or any remote devices). In one example, the system, device, and/or method may transmit data, which shows a drop off of syrup unit sales right after a cleaning cycle which recovers the next day. This may be based on the flush out function being improperly completed. In other words, there is left over cleaning fluid in the lines which provides a bad taste until it washes out. In another example, when fountain drinks go on sale by 10 percent the amount sold increases by 5 percent—this information is determined utilizing data from the CFValve. In a specific example, when fountain drinks go on sale by 10 percent the amount sold of syrup 1 goes up by 15 percent whereas sales of syrup 2 stay flat. In another example, when fountain drinks go on sale by 20 percent sales go up by 25 percent.

With the fixed flow that is created by the CFValve—in any form, CFIVE, Discrete, CFV Cartridge, and/or CFValve 1X, 2X-3. The dispensing system may utilize simple data gathering to gain very important information.

For example, with a discrete CFValve running at a fixed flow the "on-time" of the solenoid can be captured and reported. With that ON time you can automatically calculate drinks dispensed (to compare to point of sales data), flavors preferred, inventory used (automatic inventory control and reordering), and even CO2 utilized for reordering CO2. Other useful customer behavior can be gathered—size per drink dispensed, number of actuations to fill a single cup, etc.

If this is combined with a touch screen or display screen (on top of machine or on each valve) it can also add custom graphics and/or advertisements to promote customer behaviors. There can be an automatic "sold out" notification when inventory is out—it can suggest an alternate drink when syrup is low or out.

The owner of the store (c-store, restaurant, fast food) or the beverage supplier can gather information on trends immediately—drinks that sell at certain times of days or days of the week, movement in preference for types of beverages dispensed, and this information can be agglomerated by market or nationwide to spot and take advantage of trends This drink dispensing device data may be combined with other data on food, gas, liquor, cigarette, and/or lottery sales to determine customer behavior for better marketing, product placement, etc.

Figure 3B:
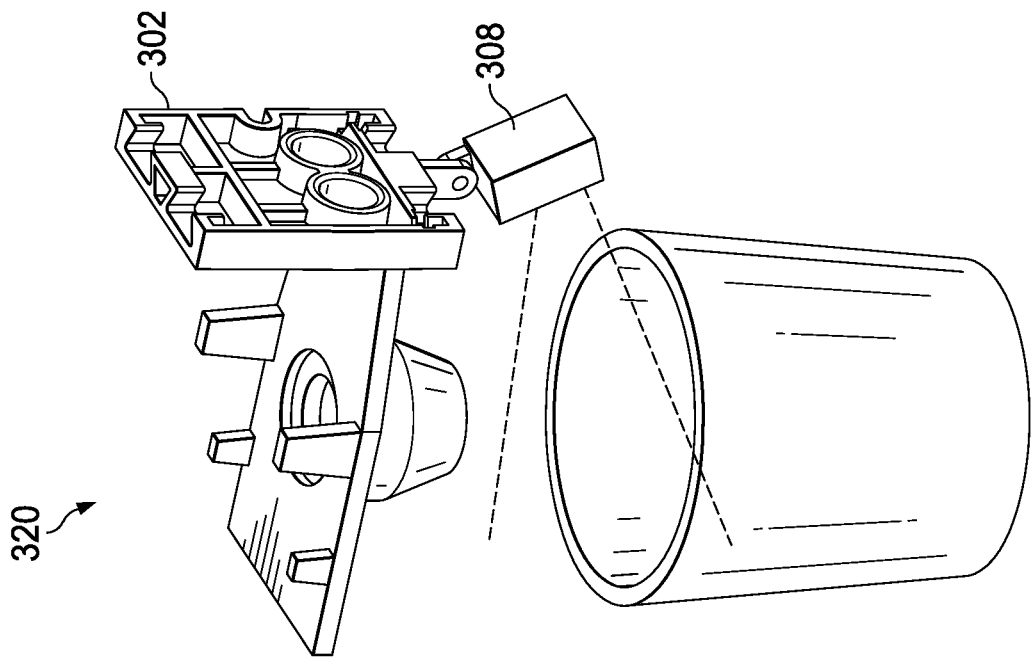
FIG. 3B is another illustration of a touchless system, according to one embodiment.
Figure 3A:
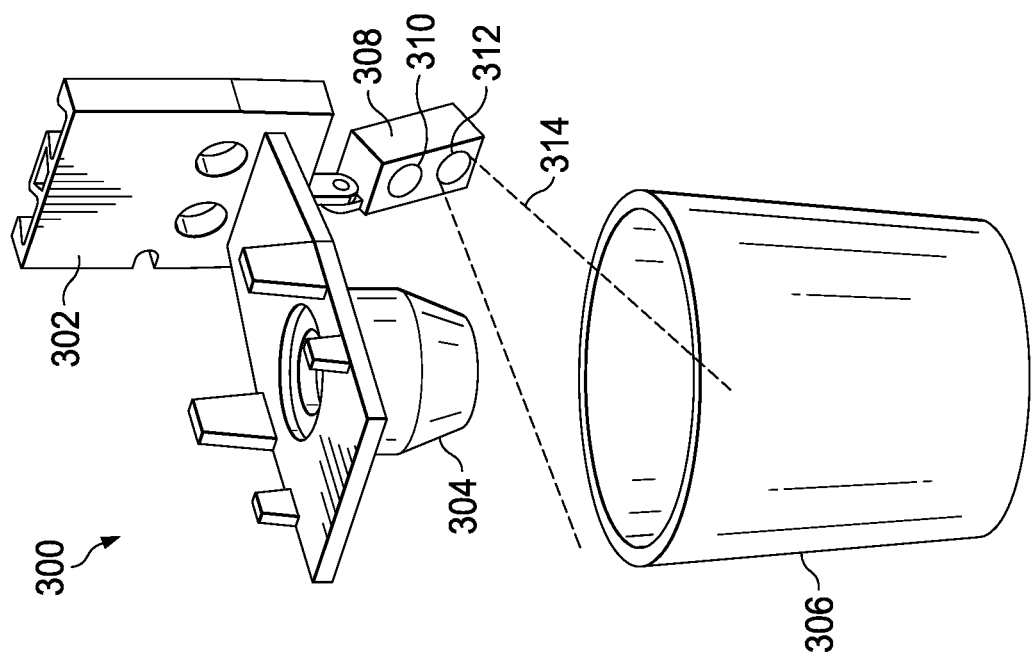
FIG. 3A is an illustration of a touchless system, according to one embodiment.

In FIG. 3A, an illustration of a touchless system is shown, according to one embodiment. FIG. 3A shows a touchless dispensing sensor located at a 20 degree angle from the vertical, which determines when to turn on and/or shut off the dispensing unit. In this example, touchless dispensing system 300 includes a mounting area 302, a diffuser 304, a cup 306, a sensor 308, a light 310, a sensing element 312, and a sensing field 314. In one example, once the touchless dispensing sensor has determined that a cup is in position there is a delay of 250 milliseconds. In various examples, the delay may be 50 milliseconds, 60 milliseconds, 70 milliseconds, 80 milliseconds, 90 milliseconds, 100 milliseconds, 110 milliseconds, 120 milliseconds, 130 milliseconds, 140 milliseconds, 150 milliseconds, 160 milliseconds, 170 milliseconds, 180 milliseconds, 190 milliseconds, 200 milliseconds, 210 milliseconds, 220 milliseconds, 230 milliseconds, 240 milliseconds, 250 milliseconds, 260 milliseconds, 270 milliseconds, 280 milliseconds, 290 milliseconds, 300 milliseconds, 310 milliseconds, 320 milliseconds, 330 milliseconds, 340 milliseconds, 350 milliseconds, 360 milliseconds, etc. In various examples shown in FIG. 3B, the touchless dispensing sensor may be located at a 25 degree angle from the vertical, a 15 degree angle from the vertical, a 16 degree angle from the vertical, a 17 degree angle from the vertical, a 18 degree angle from the vertical, a 19 degree angle from the vertical, a 20 degree angle from the vertical, a 21 degree angle from the vertical, a 22 degree angle from the vertical, a 23 degree angle from the vertical, a 24 degree angle from the vertical, a 26 degree angle from the vertical, etc.

Figure 3C:
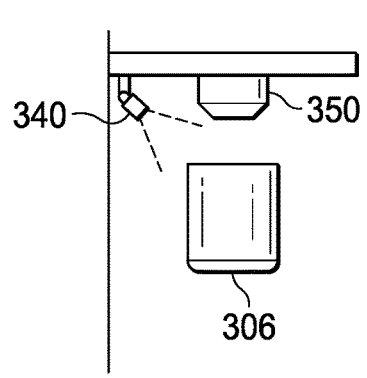
FIG. 3C is another illustration of a touchless system, according to one embodiment.
Figure 3D:
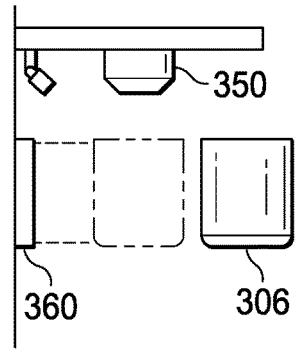
FIG. 3D is another illustration of a touchless system, according to one embodiment.
Figure 3E:
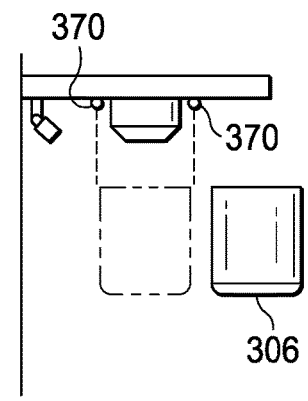
FIG. 3E is another illustration of a touchless system, according to one embodiment.
Figure 3F:
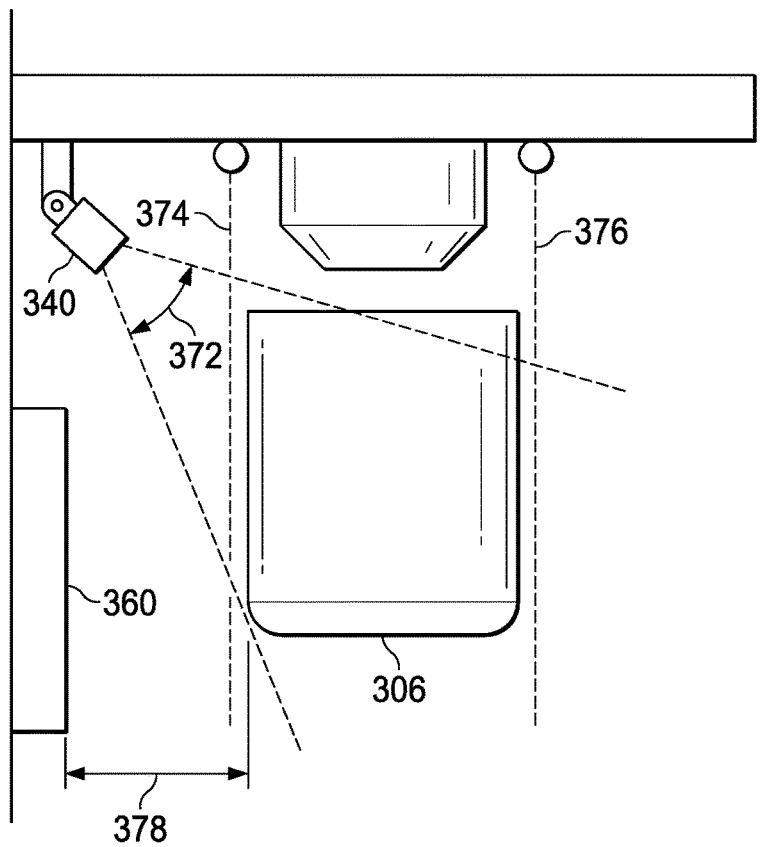
FIG. 3F is another illustration of a touchless system, according to one embodiment.

In FIG. 3C, another illustration of a touchless system is shown, according to one embodiment. FIG. 3C shows a diffuser 350, a cup 306, and the touchless dispensing sensor 340 located at an angle from the vertical of between 15 degrees and 26 degrees. FIG. 3D shows the touchless dispensing sensor 340 located at an angle from the vertical of between 15 degrees and 26 degrees, along with a second sensor 360 which is measuring the distance of a cup to a back wall location and/or a location relative to the dispensing unit 350. These measurements along with the measurements from the touchless dispensing sensor 340 can be utilized to start and/or stop the dispensing function. FIG. 3E shows the touchless dispensing sensor located at an angle from the vertical of between 15 degrees and 26 degrees along with one or more sensors 370 located next to the dispensing unit 350. One or more sensors 370 are measuring the distance of the cup relative to one or more points adjacent to the dispensing unit 350. These measurements along with the measurements from the touchless dispensing sensor 340 can be utilized to start and/or stop the dispensing function. FIG. 3F shows the touchless dispensing sensor located at an angle from the vertical of between 15 degrees and 26 degrees along with one or more sensors 370 located next to the dispensing unit 350 and also includes the second sensor 360 which is measuring the distance of a cup 306 to a back wall location and/or a location relative to the dispensing unit 350. The measurements from the touchless dispensing unit 350, the second sensor 360, and the one or more sensors 370 may be utilized to start and/or stop the dispensing function with or without a delay function and/or with or without a hard stopping function. In addition, an infrared tampering function may be utilized and/or a shut off function which may be utilized when maintenance and/or cleaning is performed. In addition, touchless dispensing sensor 340 may have a first field of view 372, according to one embodiment. The second sensor 360 may have a second field of view 378, according to one embodiment. The one or more sensors 370 may have a third field of view 374 and/or an Nth field of view 376.

A ball or other substantially round or spherical object (collectively "Ball") may be used and controlled by rolling the Ball off the opening to open the valve for fluid flow there through. This mechanism of rolling the Ball off the opening is a mechanically easier process than the conventional lifting of the Ball in order to open the passage/orifice.

With the disclosed Ball valve, once the Ball is even partially off the orifice/opening then the pressure will equalize on both sides of the orifice and the effort to move the Ball further off, farther to fully open, takes almost no energy at all. Once the Ball is decoupled from the magnet or the electro magnet is off—the fluid flow itself will roll [suck] the Ball back into the orifice and close the valve. The higher the input pressure the tighter the valve closes. In practice the orifice, as depicted, would be the most accommodating design for a valve seat as well (i.e. a self-cleaning rubber design) as used in the CFValves.

Figure 4A:
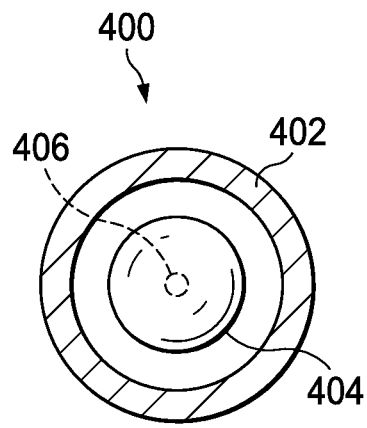
FIG. 4A is illustration of a movement system, according to one embodiment.
Figure 4B:
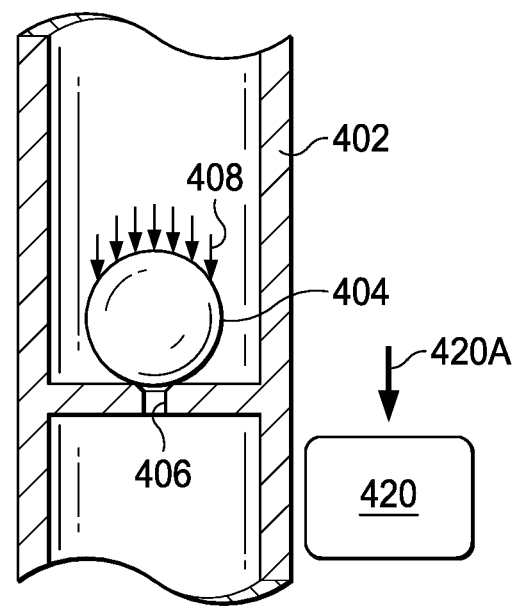
FIG. 4B is another illustration of a movement system, according to one embodiment.

FIG. 4A and FIG. 4B illustrate a first embodiment for the valve in a valve closed position. FIG. 4A illustrates a top sectional view, whereas FIG. 4B illustrates a side sectional view for the first embodiment in the closed position. As seen in these two Figures, a Ball covers/closes an orifice opening with a portion of the Ball extending into the orifice opening. With the Ball closing the orifice opening, fluid is prevented from flowing through the pipe, tube, chamber, hose or other type of fluid conduit (all collectively referred to as "Conduit"). As seen in FIG. 4B, a magnetic coupling located on an external/outside of the Conduit is out of magnetic range of the metal Ball and thus is unable to control the movement or position of the Ball. The Ball is therefore forced in the shown sealing position, with respect to the orifice opening, by the pressure flow within the Conduit. Preferably, the Ball is constructed from a magnetic, metallic and/or rigid material and all are considered within the scope of this disclosure.

In FIG. 4A, an illustration of the ball functionality is shown, according to one embodiment. In one example, a dispensing element 400 may include a conduit 402, a blocking element 404, and a dispensing element 406. In various examples, the conduit 402 may be a hose, a pipe, and/or any other element with an external surface and an internal surface, which allows for the passage of one or more fluids and/or one or more gases. In various examples, the blocking element 404 may be a ball, a block, and/or any other element that stops the passage of one or more fluids and/or one or more gases when the blocking element is in one or more positions relative to the dispensing element. In this example shown in FIG. 4A, the blocking element 404 is positioned over the dispensing element 406 which stops the passage of one or more fluids and/or one or more gases which can be seen in FIG. 4B. In the example shown in FIG. 4B, the blocking element 404 stops a fluid flow because the flow is putting pressure 408 on the blocking element 404, which creates a seal between the blocking element 404 and the dispensing element 406 (the dispensing element 406 in this example is a hole and/or the orifice opening(s)). A movement device 420 (e.g., a magnet) is in a first position 420A, which does not allow the movement device 420 to interact with the blocking element 404.

Figure 5:
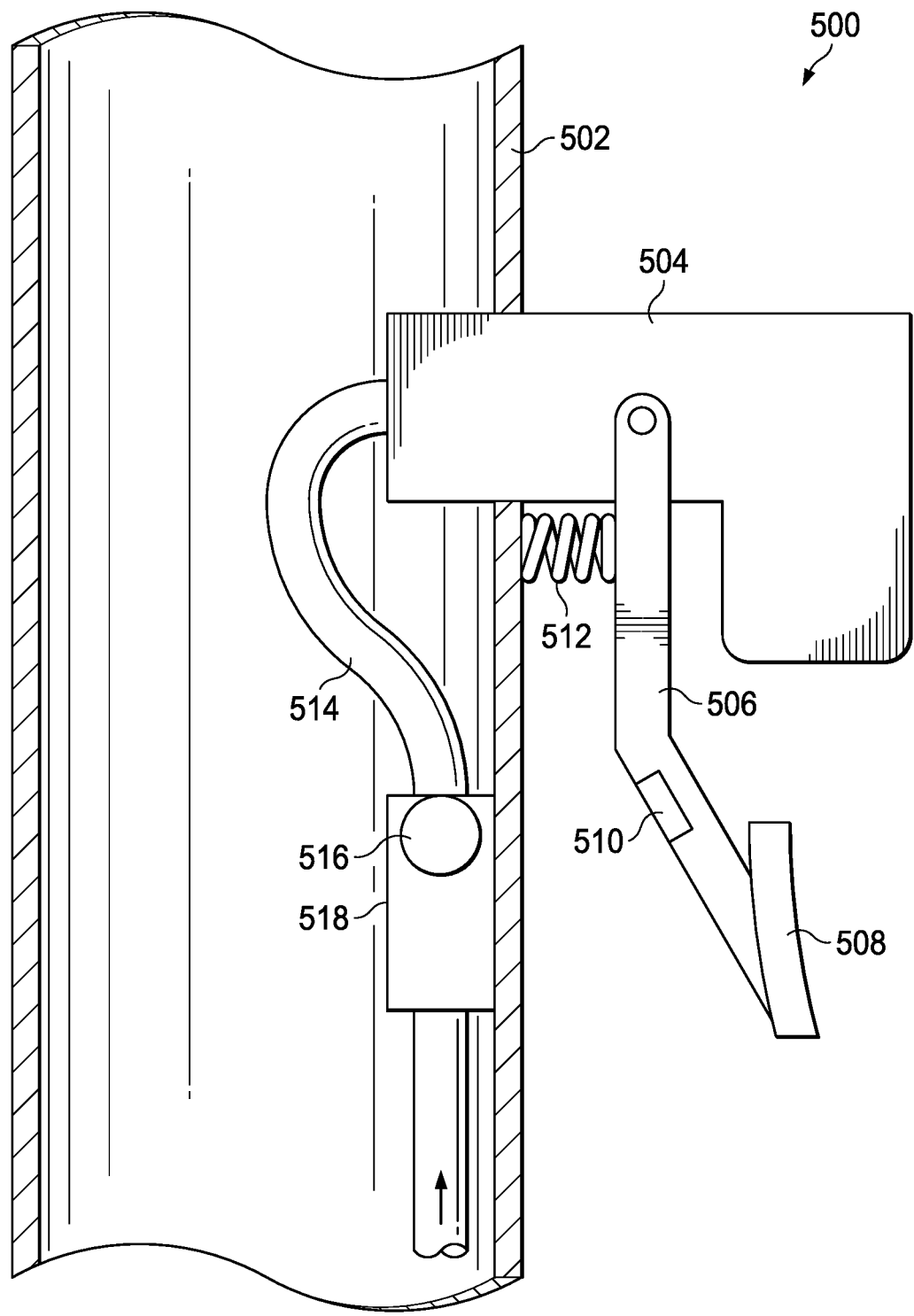
FIG. 5 is an illustration of a dispensing system with a movement and/or blocking device, according to one embodiment.

In FIG. 5, an illustration of a dispensing unit with one or more ball functionalities is shown, according to one embodiment. A dispensing system 500 may include a dispensing unit 502. The dispensing unit 502 may include a dispensing head 504, an input device 506 with an input receiving area 508 and magnetic area 510, a drink unit 518 with a blocking element 516, and a feed line 514. Further, the input device 506 may have a spring support 512. In one example, when a person wants a drink that person pushes their cup on the input receiving area 508, which moves the input device 506 towards the drink unit 518. After the input device 506 (and the magnetic area 510) comes in proximate to the drink unit 518 (and the blocking element 516) flow of the fluid is initiated based on the magnetic area 510 moving the blocking element 516. Once the person stops pushing the input device 506, the magnetic area 510 moves away from the blocking element 516 and the flow of fluids is stopped by the blocking element 516. It should be noted that the initiating function may be touchless (See FIGS. 3A-3F).

Figure 6:
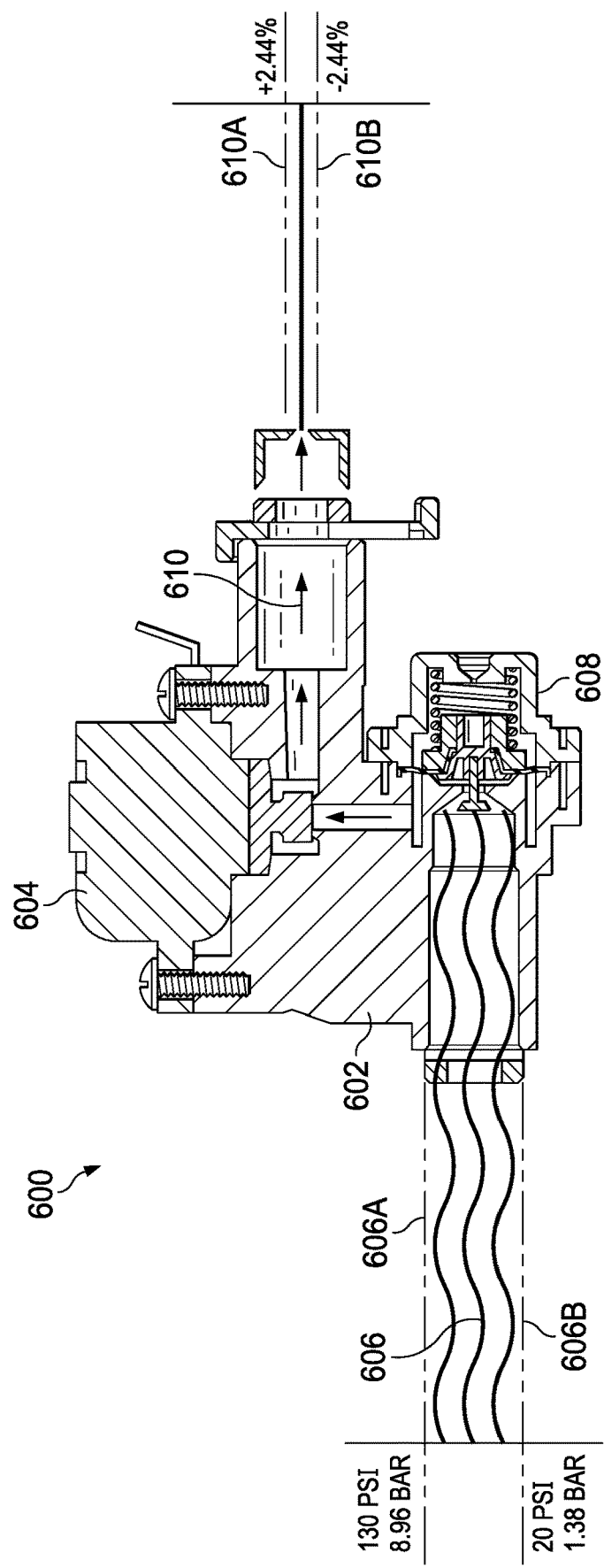
FIG. 6 is an illustration of a CF Valve, according to one embodiment.

In FIG. 6, an illustration of a CF Isolation Valve 600 is shown, according to one embodiment. The CF Isolation Valve 600 may include a housing 602, a solenoid 604, an inlet area, an outlet area, and a CFValve 608. In this example, the CF Isolation Valve 600 receives an inlet flow 606 and produces an outlet flow 610. In this example, the inlet flow 606 varies from a first pressure 606A (e.g., 130 PSI) to an Nth pressure (e.g., 20 PSI). Further, in this example, the outlet flow 610 is produced with a target flow that is +/−2.44% (See reference numbers 610A and 610B). Therefore, regardless of the inlet pressure fluctuations, the CF Isolation Valve 600 delivers a constant output pressure flow downstream. The CFValve diaphragm assembly is tuned to constantly modulate to maintain the set downstream application pressure and flow rate.

Figure 7:
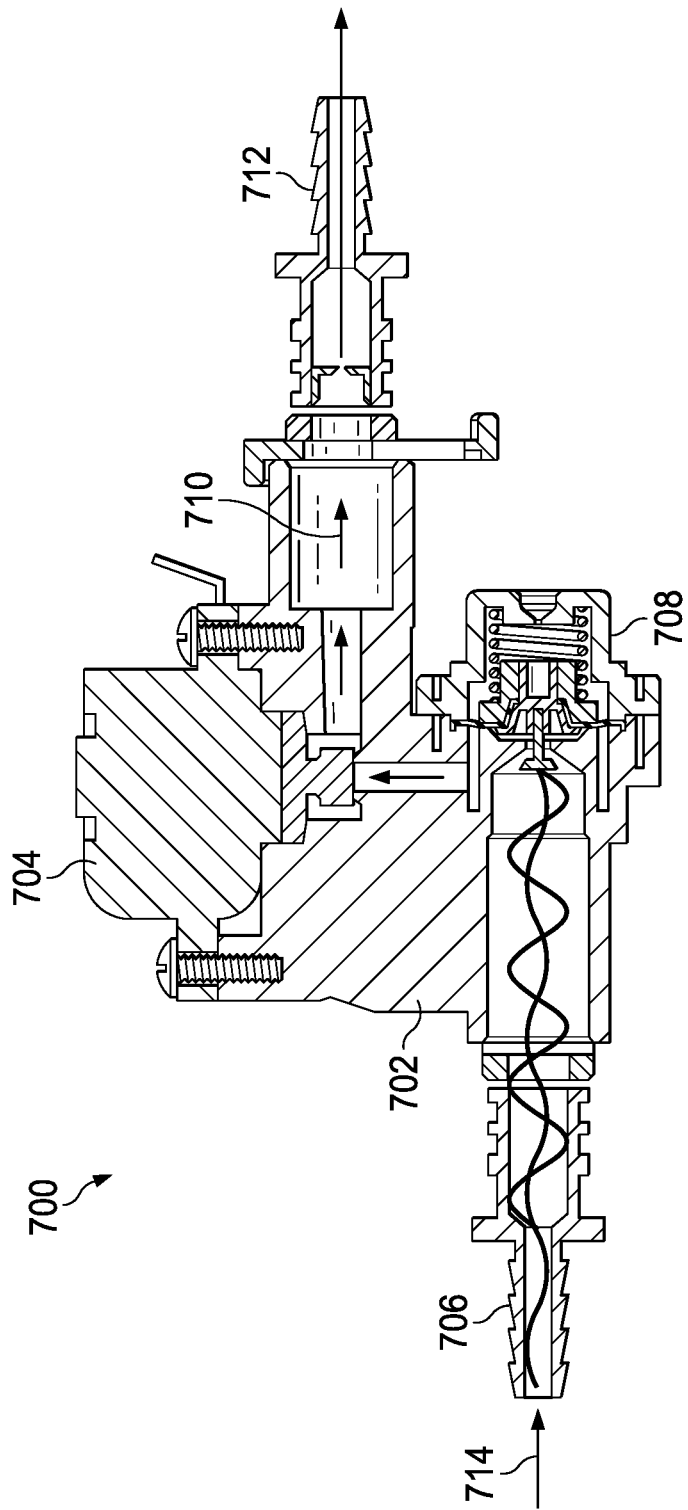
FIG. 7 is an illustration of a CF Valve, according to one embodiment.

In FIG. 7, an illustration of a CF Isolation Valve 700 is shown, according to one embodiment. The CF Isolation Valve 700 may include a housing 702, a solenoid 704, an inlet area, an outlet area, a first barb fitting 706, a CFValve 708, and a second barb fitting 712. In various examples, various orifice sizes can be utilized. For example, a 0.056" orifice can be utilized for 1.0 ounces/second still. In another example, a 0.063" orifice can be utilized for 1.2 ounces/second still. In another example, a 0.073" orifice can be utilized for 1.4 ounces/second carbonated. In yet another example, a 0.080" orifice can be utilized for 1.6 ounces/second carbonated. In this example, there is an inlet flow 714 and an outlet flow 712.

Figure 8A:
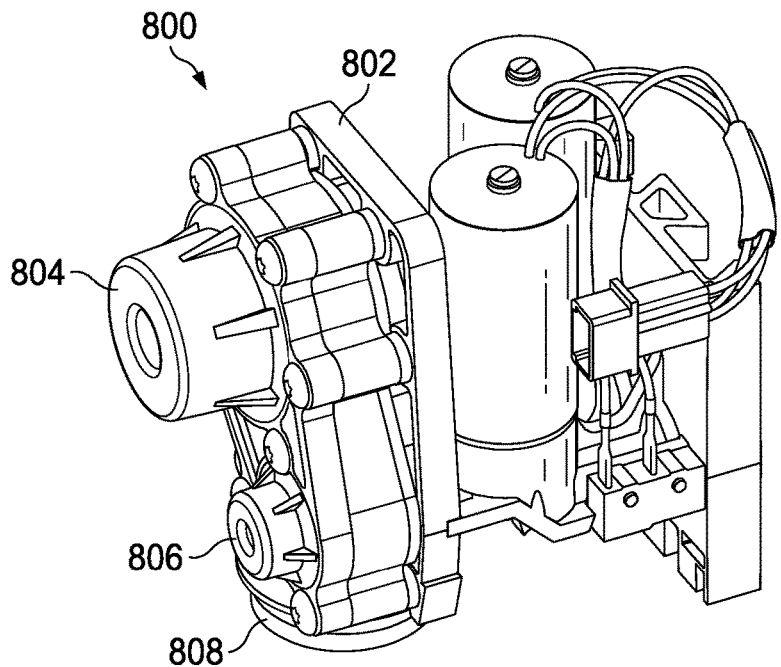
FIG. 8A is an illustration of a discrete CF Valve, according to one embodiment.
Figure 8B:
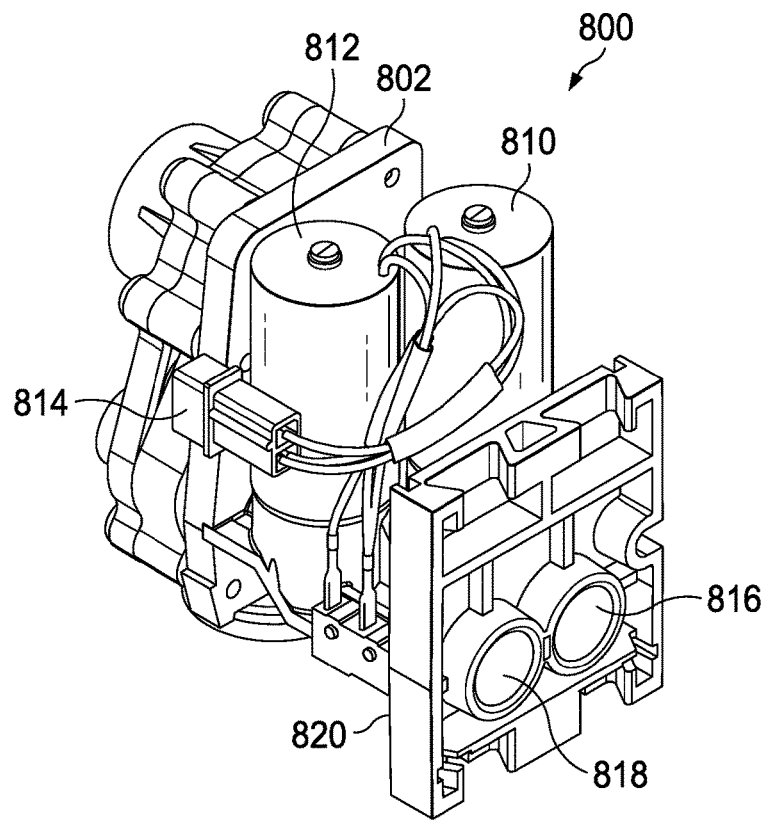
FIG. 8B is another illustration of a discrete CF Valve, according to one embodiment.

In FIG. 8A, an illustration of a discrete CF Valve 800 is shown, according to one embodiment. The discrete CF Valve 800 may include a housing 802, a water CFValve 804, a syrup CF Valve 806, and an outlet area 808. The discrete CF Valve 800 may also include a water solenoid 810, a syrup solenoid 812, one or more electrical connections 814, a water inlet area 816, a syrup inlet area 818, and a mounting block 820 (See FIG. 8B).

In FIG. 9A, an illustration of a discrete CF Valve 900 is shown, according to one embodiment. The discrete CF Valve 900 may include a backing block 902, one or more solenoids 904, a solenoid body mount 906, an o-ring seal insert 908, a second mounting block 910, a seal insert 912, a first throttle pin 914, a second throttle pin 916, a first o-ring 918, a second o-ring 920, a CF Valve body 922, a first diaphragm 924, and/or a second diaphragm 926. In one example, the first o-ring 918 is 1.75X and the second o-ring 920 is 1.0X. In addition, in this example, the first diaphragm 924 is 1.75X and the second diaphragm 926 is 1.0X. Further, the discrete CF Valve 900 may include a core tube housing 928, a plunger 930, a plunger seal 932, a plunger spring 934, and/or a sealing element 936. In addition, as shown in FIG. 9B, the discrete CF Valve 900 may include a first solenoid 904A (e.g., water) and a second solenoid 904B (e.g., syrup) and/or an Nth solenoid (e.g., additional elements—carbonated water, additional syrups, nitrogen, other gases, other elements—whipped cream, etc.).

Figure 10:
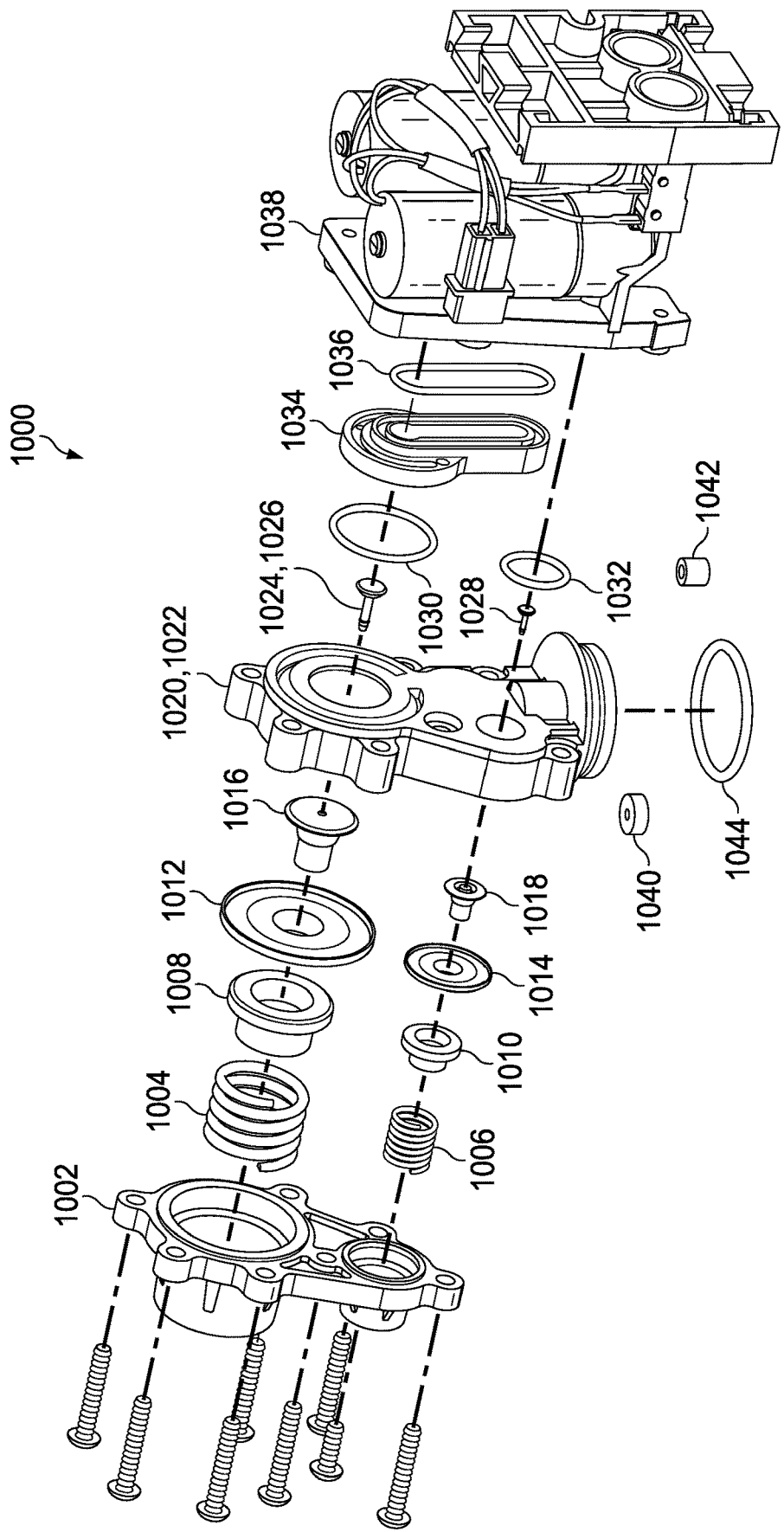
FIG. 10 is an illustration of a CF Valve, according to one embodiment.

In FIG. 10, an illustration of a CF Valve 1000 is shown, according to one embodiment. In one example, the CF Valve 1000 may include a spring cap 1002, a first spring 1004, a second spring 1006, a first retainer bottom 1008, a second retainer bottom 1010, a first diaphragm 1012, a second diaphragm 1014, a first retainer top 1016, a second retainer top 1018, a first CFValve body 1020, a second CFValve body 1022, a first throttle pin 1024, a second throttle pin 1026, a third throttle pin 1028, a first o-ring 1030, a second o-ring 1032, a seal insert 1034, an o-ring seal insert 1036, one or more solenoids 1038, a syrup orifice 1042, a water orifice 1044, and an o-ring diffuser 1044. In various examples, the first spring 1004 is 1.75X, the second spring 1006 is 1.0X, the first retainer bottom 1008 is 1.75X, the second retainer bottom 1010 is 1.0X, the first diaphragm 1012 is 1.75X, the second diaphragm 1014 is 1.0X, the first retainer top 1016 is 1.75X, the second retainer top 1018 is 1.0X, the first CFValve body 1020 is 1.75X, the second CFValve body 1022 is 1.0X, the first throttle pin 1024 is 1.75X, and the second throttle pin 1026 is 1.0X.

Figure 11:
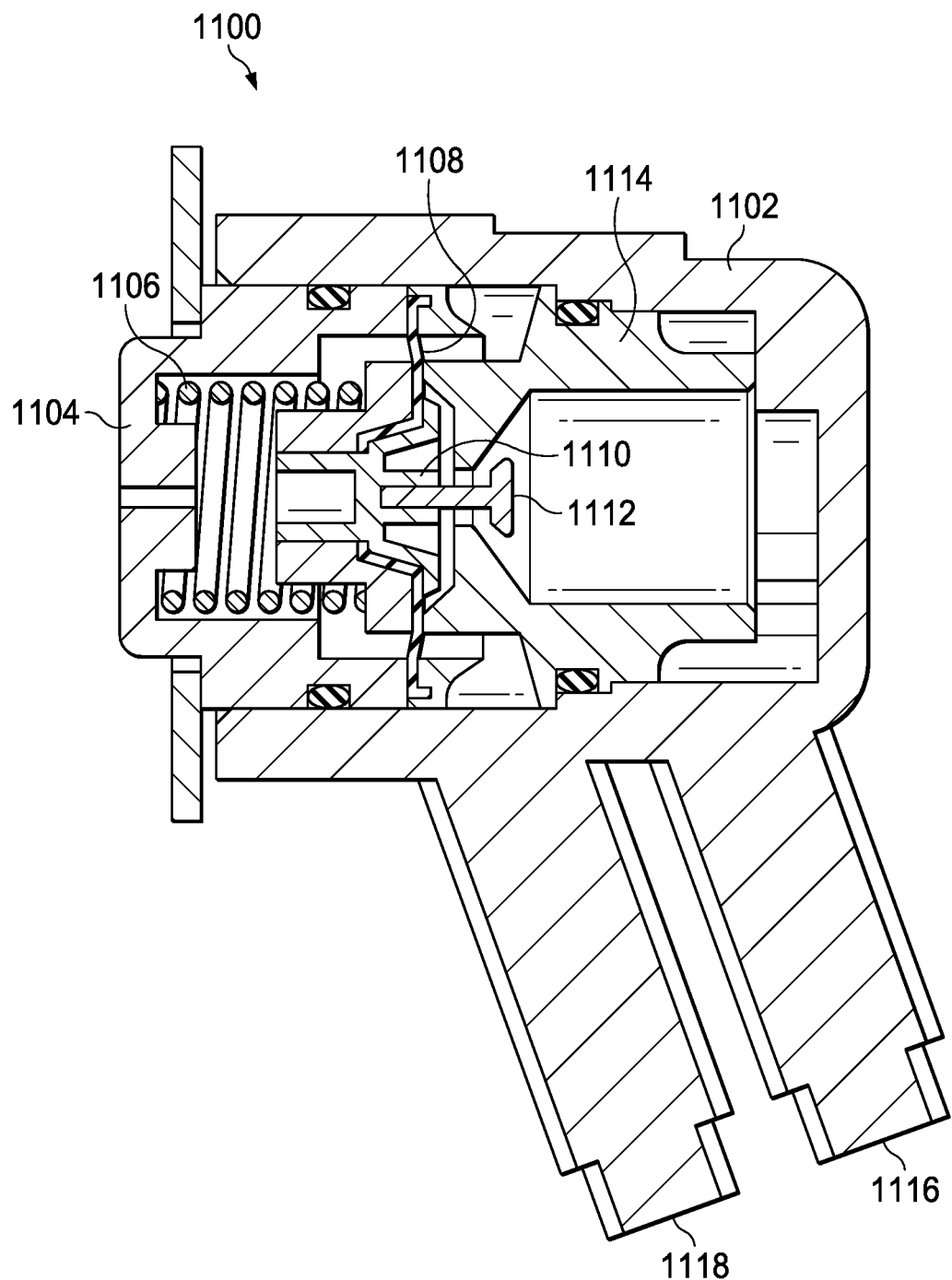
FIG. 11 is an illustration of a CFV Cartridge Insert, according to one embodiment.

In FIG. 11, an illustration of a CFV Cartridge Insert 1100 is shown, according to one embodiment. The CFV Cartridge Insert 1100 may include a housing 1102, a cap 1104, a spring 1106, a diaphragm 1108, a diaphragm assembly with retainers 1110, a throttle pin 1112, a CFV body 1114, an inlet of manifold 1116, and/or an outlet of manifold 1118.

Figure 12:
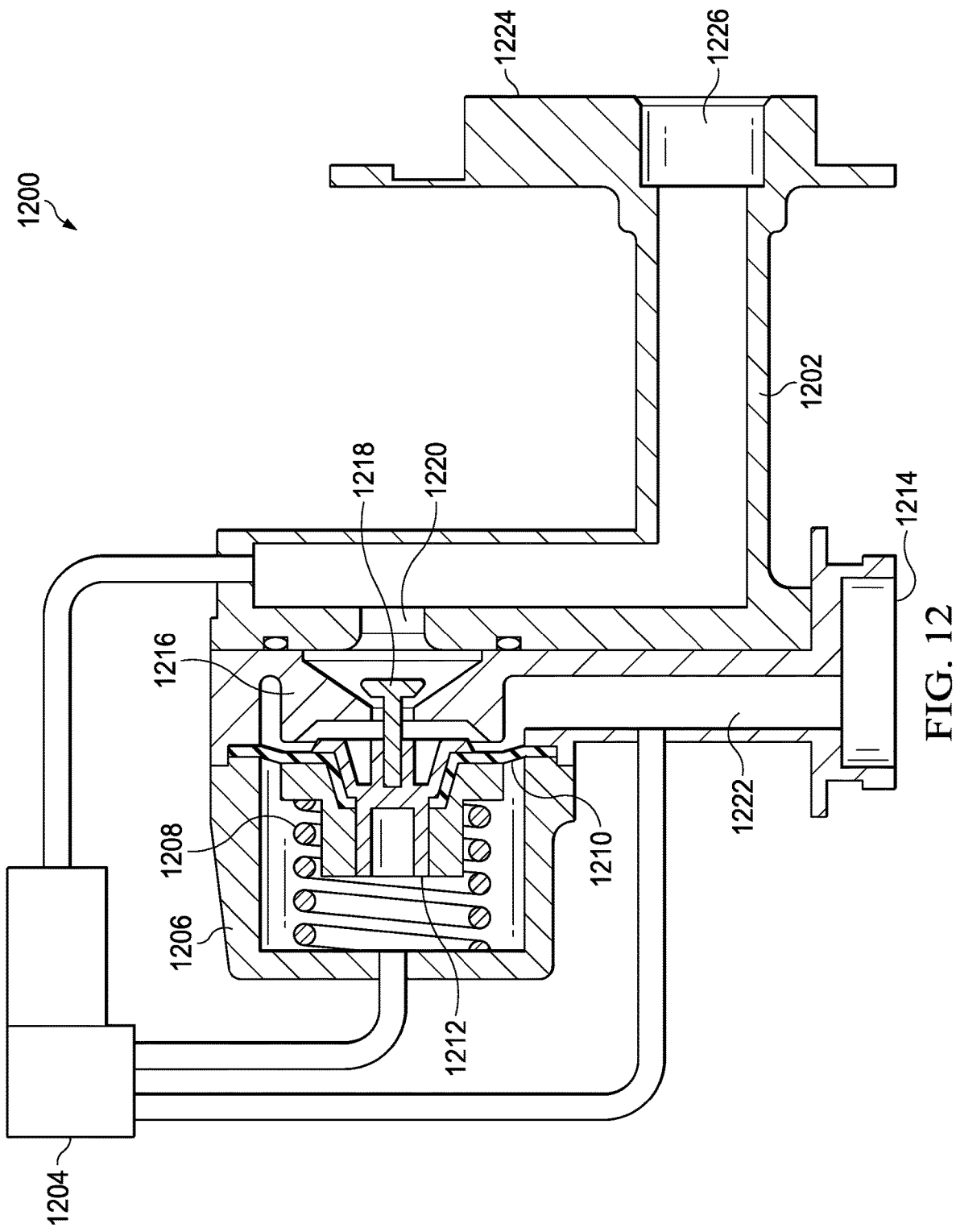
FIG. 12 is an illustration of a Non-Electric-Mechanical discrete CF Valve, according to one embodiment.

In FIG. 12, an illustration of a Non-Electric-Mechanical discrete CF Valve 1200 is shown, according to one embodiment. The mechanical discrete CF Valve 1200 may include a housing 1202, a mechanical valve 1204, a spring cap 1206, a spring 1208, a diaphragm 1210, a diaphragm assembly 1212, a syrup and/or water outlet 1214 (e.g., post mix or premix), a CF Valve body 1216, a throttle pin 1218, a valve inlet 1220, a valve outlet 1222, a backing block connection 1224, and/or a water or a syrup inlet 1226 (e.g., one or more water and/or one or more syrup per valve can be implemented). In this example, the mechanical discrete CF Valve 1200 is in an open position.

Figure 13:
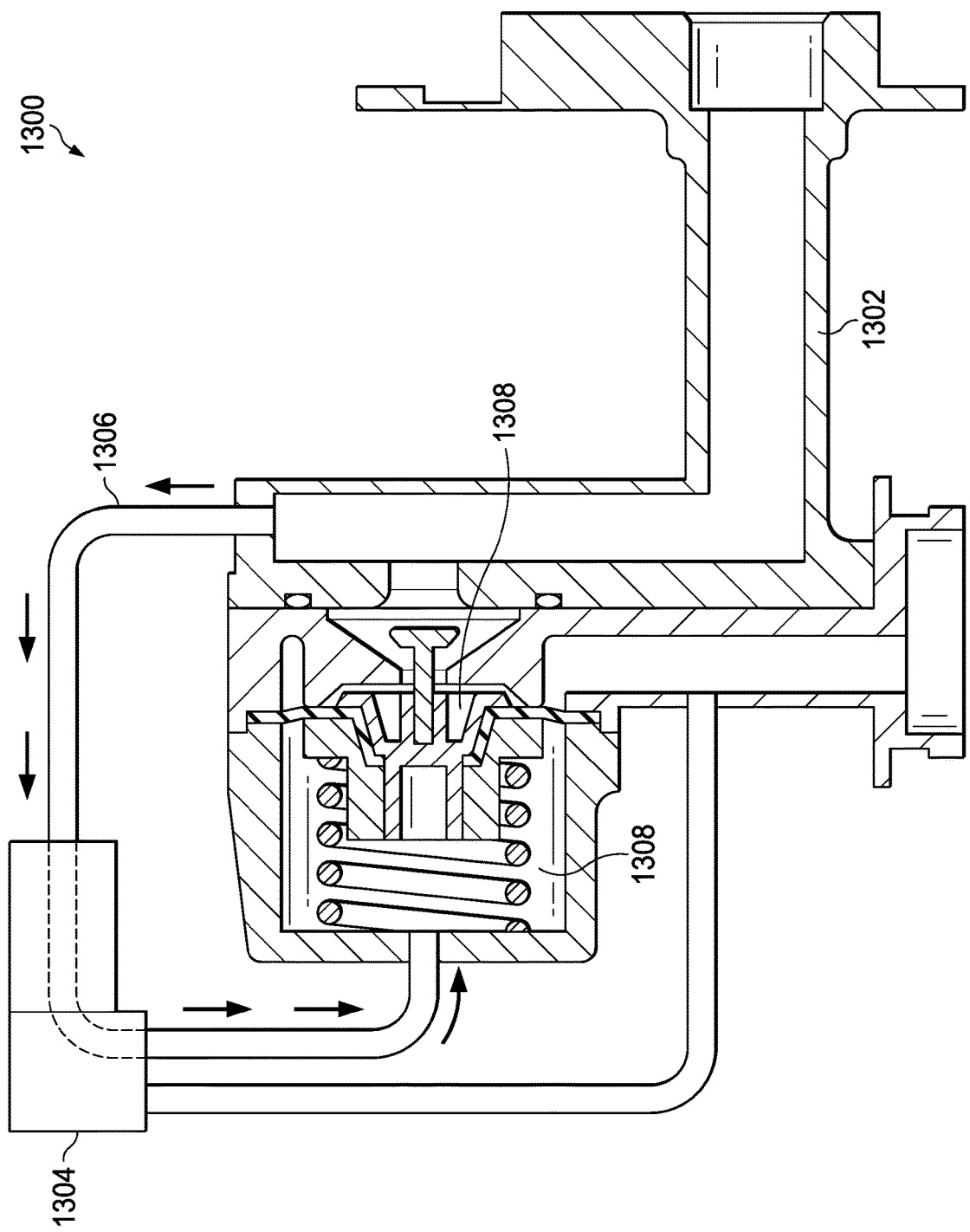
FIG. 13 is another illustration of a Non-Electric-Mechanical discrete CF Valve, according to one embodiment.

In FIG. 13, another illustration of a Non-Electric-Mechanical discrete CF Valve 1300 is shown, according to one embodiment. The mechanical discrete CF Valve 1300 may include a housing 1302, a mechanical valve 1304 and/or a bypass line 1306. The bypass line 1306 allows the water and/or syrup pressure from the inlet side of the valve to be diverted into the spring cup, which equalizes the pressure on either side 1308 of the diaphragm allowing the spring to hold the valve in the off position. In this example, the mechanical discrete CF Valve 1200 is in a closed position.

In FIG. 14, another illustration of a Non-Electric-Mechanical discrete CF Valve 1400 is shown, according to one embodiment. The mechanical discrete CF Valve 1400 may include a housing 1402, a mechanical valve 1404, a vent line 1406, and/or a bypass line 1306. In one example, when the 3 way valve is actuated the water/syrup that is in the spring cavity vents allowing the CF Valve to operate normally. This momentary venting of water/syrup from the spring cup to the downstream side of the diaphragm breaks the equilibrium created by the bypass line 1306 described in FIG. 13.

Figure 15A:
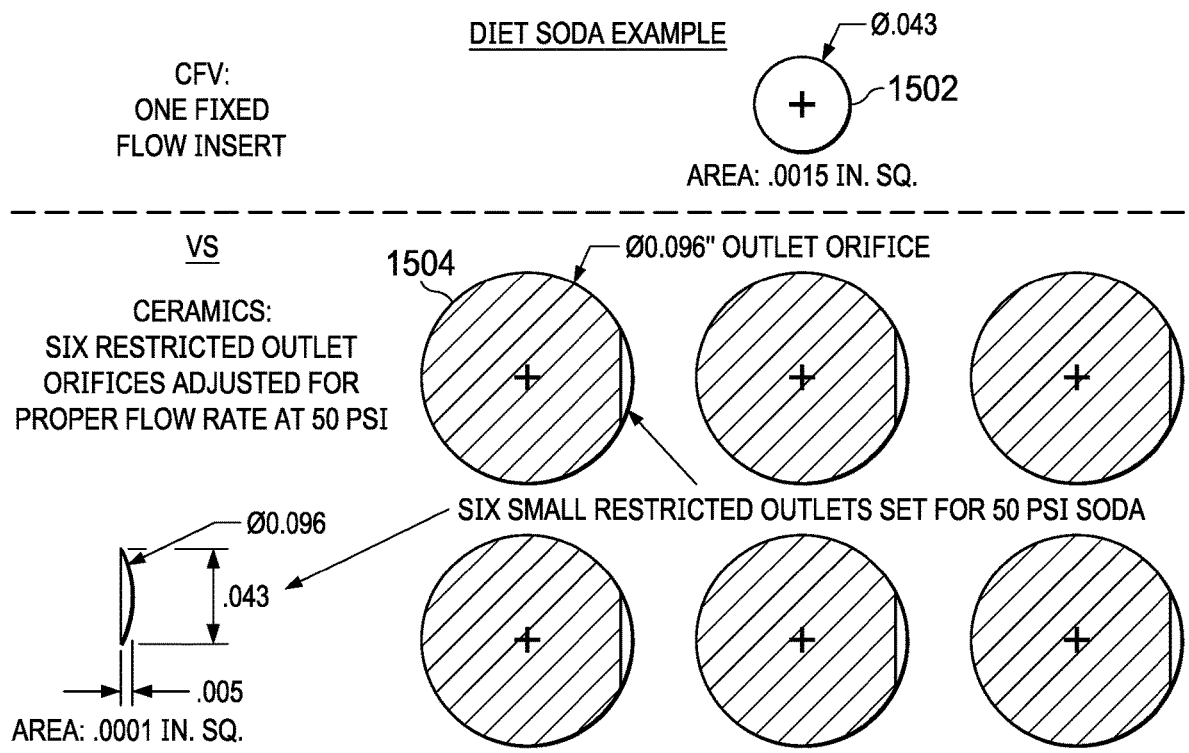
FIG. 15A is an illustration of a comparison of orifice sizes, according to one embodiment.
Figure 15B:
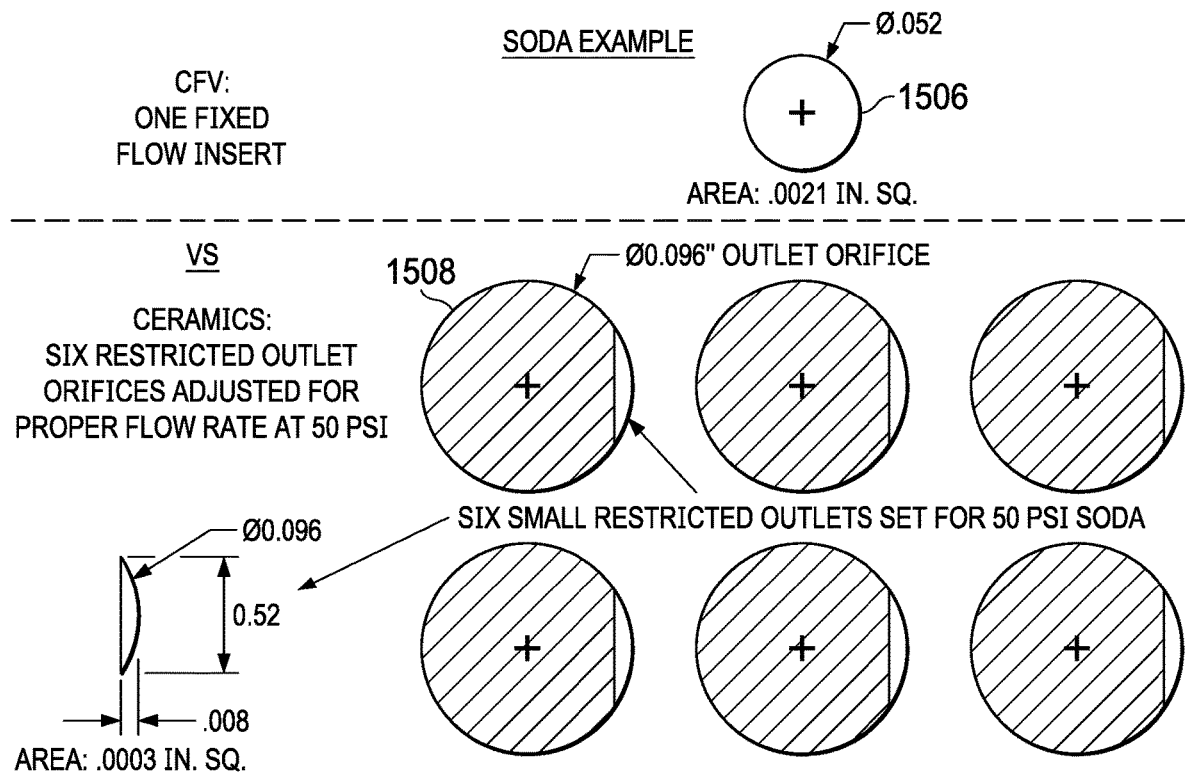
FIG. 15B is another illustration of a second comparison of orifice sizes, according to one embodiment.

In FIG. 15A, an illustration of a comparison of orifice sizes 1500 is shown, according to one embodiment. In one example, a CFValve with one fixed flow insert has a first orifice size 1502 of 0.043" at 15 PSI. Whereas, the ceramics has six restricted outlet orifices 1504 with a size of 0.096" which are adjusted for proper flow rate at 50 PSI. In another example, the CFValve has one fixed flow insert with a second orifice size 1506 of 0.052" at 15 PSI (See FIG. 15B). Whereas, the ceramics has six restricted outlet orifices 1508 with a size of 0.096" which are adjusted for proper flow rate at 50 PSI (See FIG. 15B).

Figure 16A:
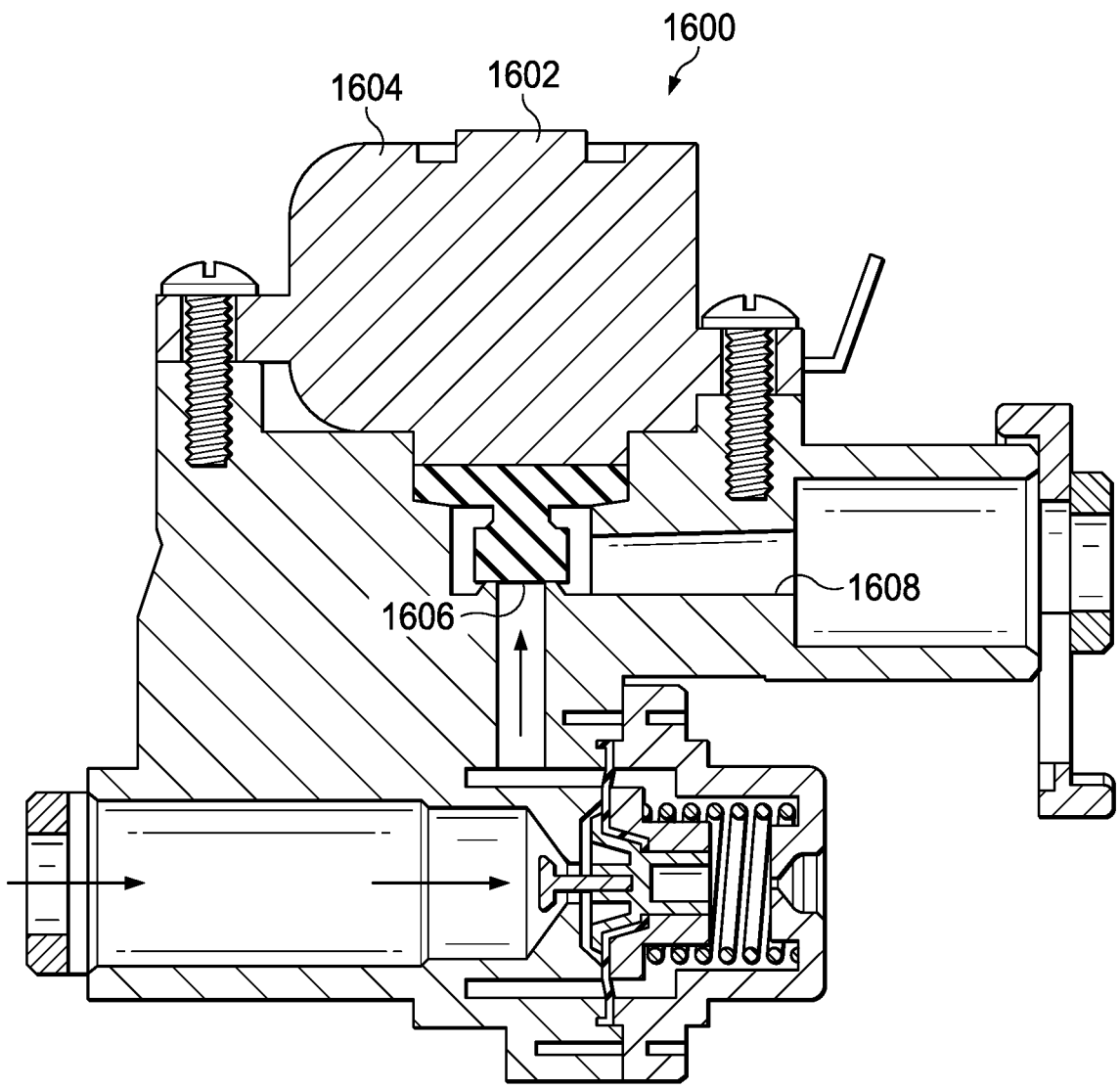
FIGS. 16A-B are illustrations of a pulsed solenoid, according to one embodiment.
Figure 16B:
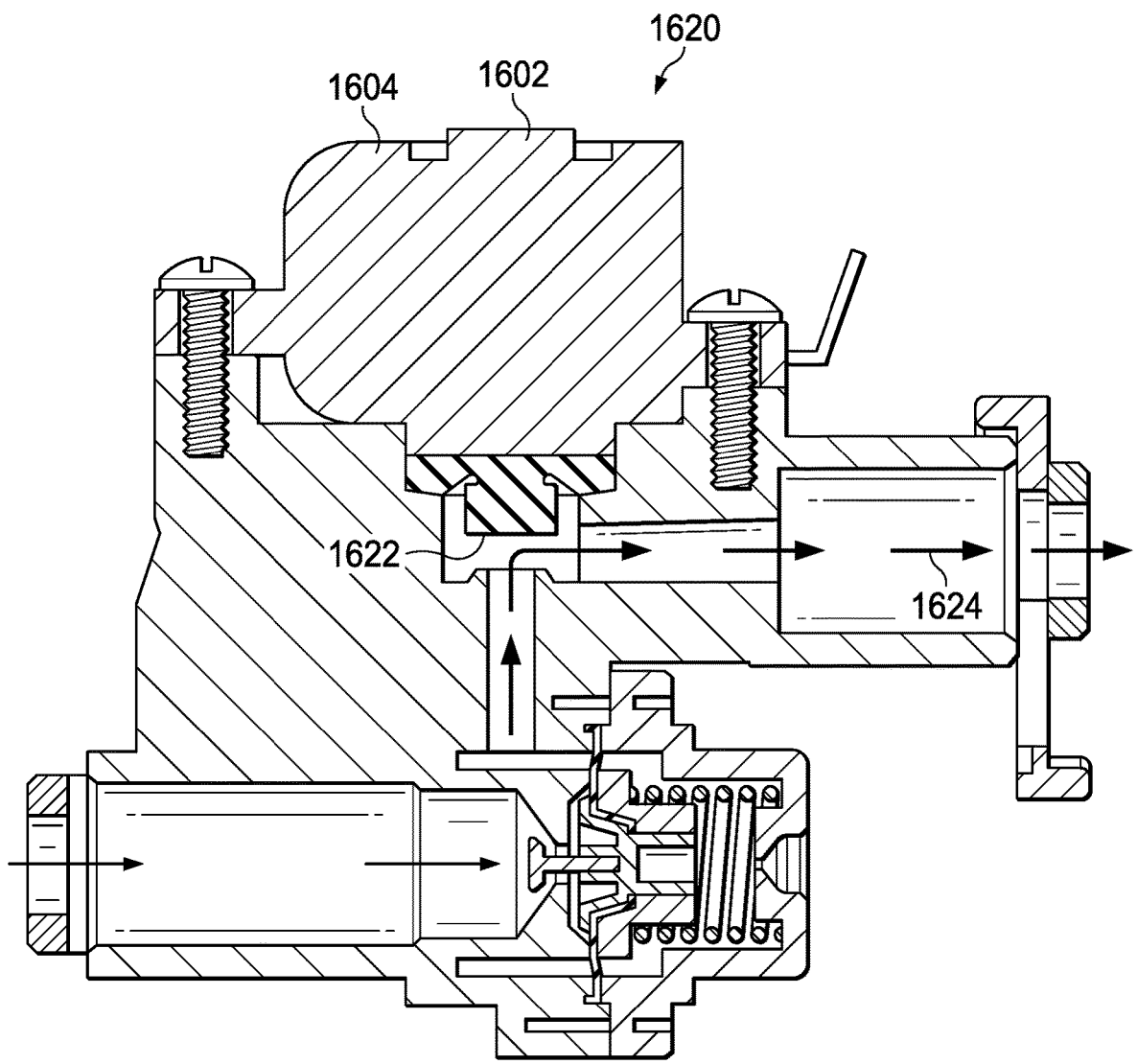

In FIGS. 16A-B, illustrations of a pulsed solenoid are shown, according to one embodiment. FIG. 16A shows a CF Isolation Valve 1600 which may include a housing 1602, a solenoid 1604, a plunger 1606, and a first flow rate 1608. In this example, the plunger 1606 is pulsing (e.g., opening and closing) 4 times per 2 second pour. In another example, a plunger 1622 is pulsing (e.g., opening and closing) 5 times per 2 second pour which creates a second flow rate 1624 (See FIG. 16B). In addition, the plunger could be left on for a full dispensing rate. A solenoid that controls the on-off for a CFValve can be utilized to set a flow rate or fine tune a flow rate for a specific recipe.

For example if a CFValve is set to run Cola at 0.5 oz./second and another CFValve is set to run Rum at 0.5 oz./second and A lime Flavor shot at 0.5 oz./second—and the goal is a mix of 4 parts cola, 1 part rum and 0.1 parts lime flavor. Then the programs controlling the valves can be set to pulse on/off to achieve the desired mixture for that drink recipe.

Figure 17A:
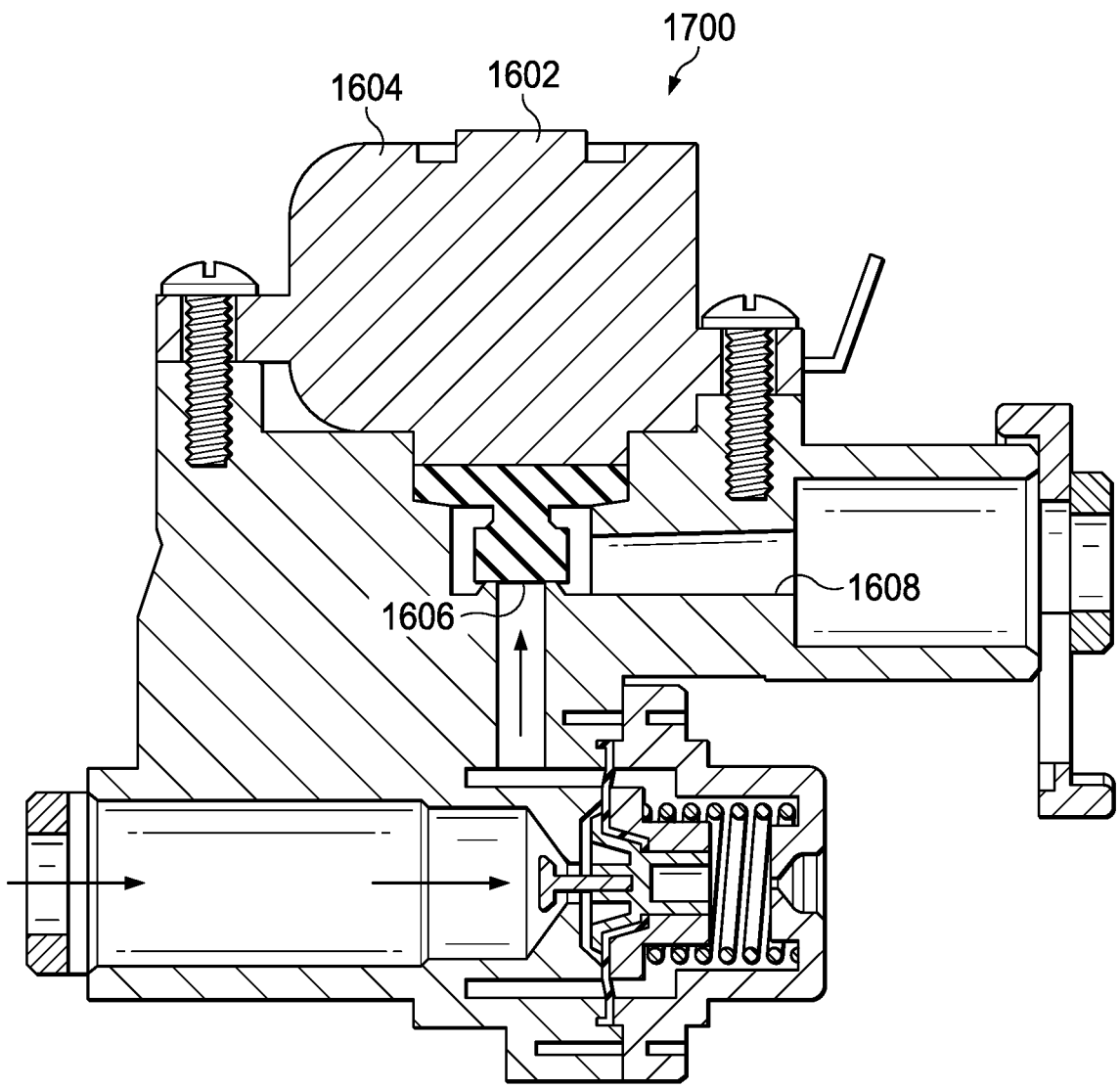
FIGS. 17A-C are illustrations of a lift solenoid, according to one embodiment.
Figure 17B:
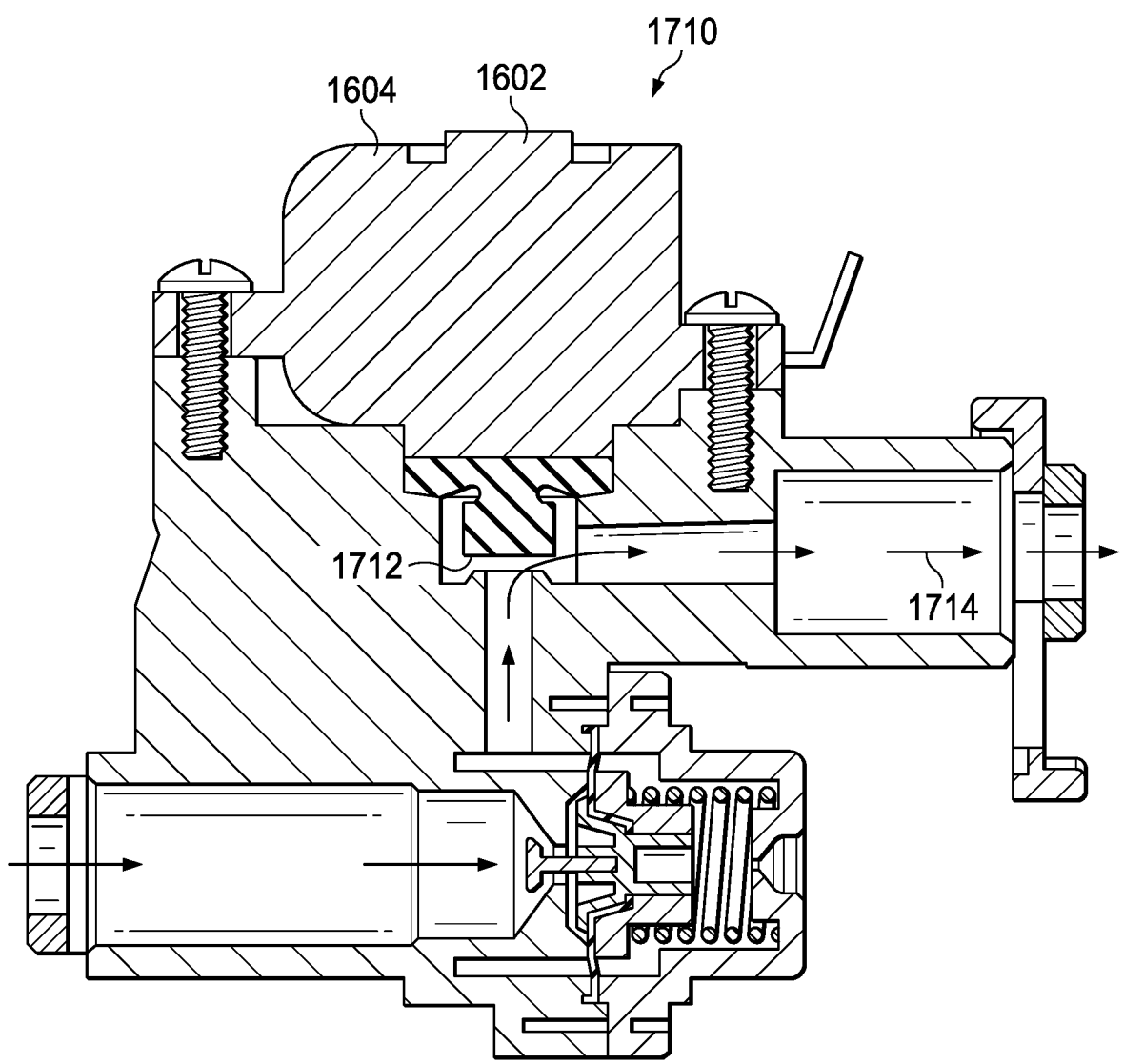
Figure 17C:
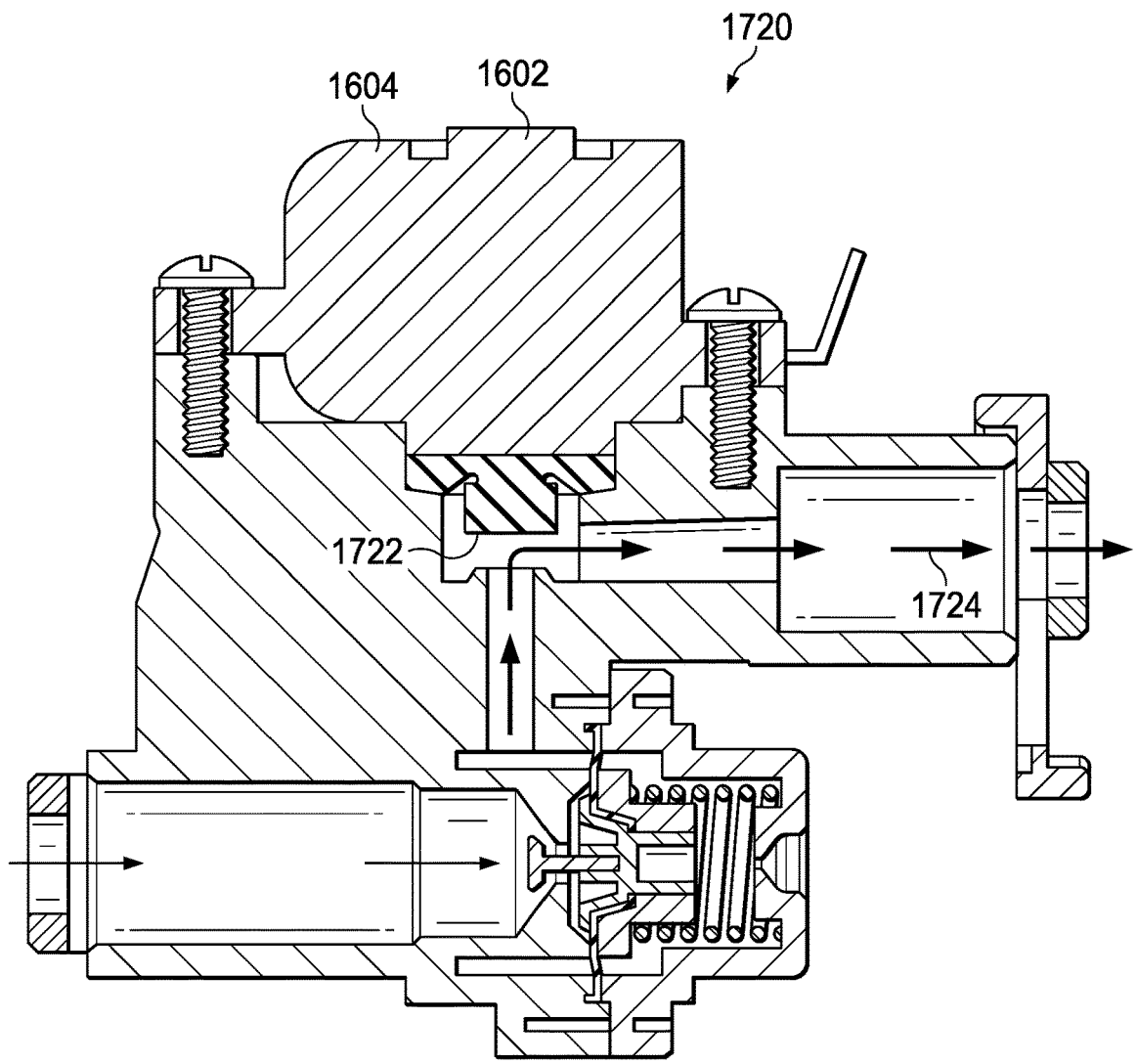

In FIGS. 17A-C, illustrations of a lift solenoid are shown, according to one embodiment. In one example, a CF Isolation Valve 1700 may include a housing 1602, a solenoid 1604, a plunger 1606, and an exiting flow rate 1608. FIG. 17A shows the CF Isolation Valve 1700 in a closed position because the plunger 1606 blocks the flow. In FIG. 17B, the plunger is lifted by 0.010" 1712 which creates a second flow rate 1714. Further, in FIG. 17C, the plunger is lifted by 0.020" 1722 which creates a third flow rate 1724 where the third flow rate 1724 is greater than the second flow rate 1714 because the first lift (e.g., 0.010") is smaller than the second lift (e.g., 0.020").

The solenoid pull piece or seals on the opening (volcano) when it is in a shut position, it lifts off that opening to allow for flow through. If the solenoid lift is modulated so that the pull piece lifts higher or lower depending on the desired flow rate it can be used to modulate flow when coupled with a CFValve upstream With the constant pressure upstream from the CFValve, the Solenoid lift can be used to increase or decrease flow rate. This can be done manually (tightening or loosening the spring that holds the pull piece in place) or electronically by increasing or decreasing the power to the solenoid causing the pull piece to lift higher or lower depending on the electrical signal.

For example if the opening/volcano is 0.100 inches in diameter, then the solenoid seal lifts only 0.010 inches off the seal it will generate a flow rate of A and if it lifts 0.020 inches off the seal the flow rate will increase as the total flow that passes through the opening and the solenoid plunger will increase as more space is allowed.

The shape of the solenoid plunger or plunger seal and the shape of the opening can be optimized to allow for fine tune changing of the flow rate by adding a funnel to the opening and/or a pointed shape to the solenoid plunger so that as it lifts it opens only a small amount more (vs. if it were a flat surface raising off a flat opening).

Figure 18:
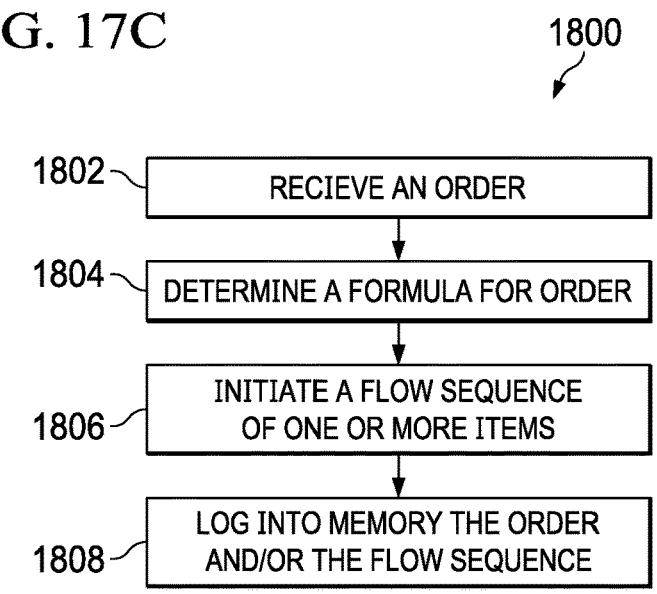
FIG. 18 is an illustration of a process flow diagram, according to one embodiment.

In FIG. 18, an illustration of a process flow diagram is shown, according to one embodiment. A method 1800 may include receiving an order (step 1802). The method 1800 may include determining a formula for the order (step 1804). The method 1800 may include initiating a flow sequence of one or more items (step 1806). The method 1800 may include logging into memory the order and/or the flow sequence (step 1808). The method 1800 may transmit one or more data points to an external device via the internet or other communication avenues.

Figure 19:
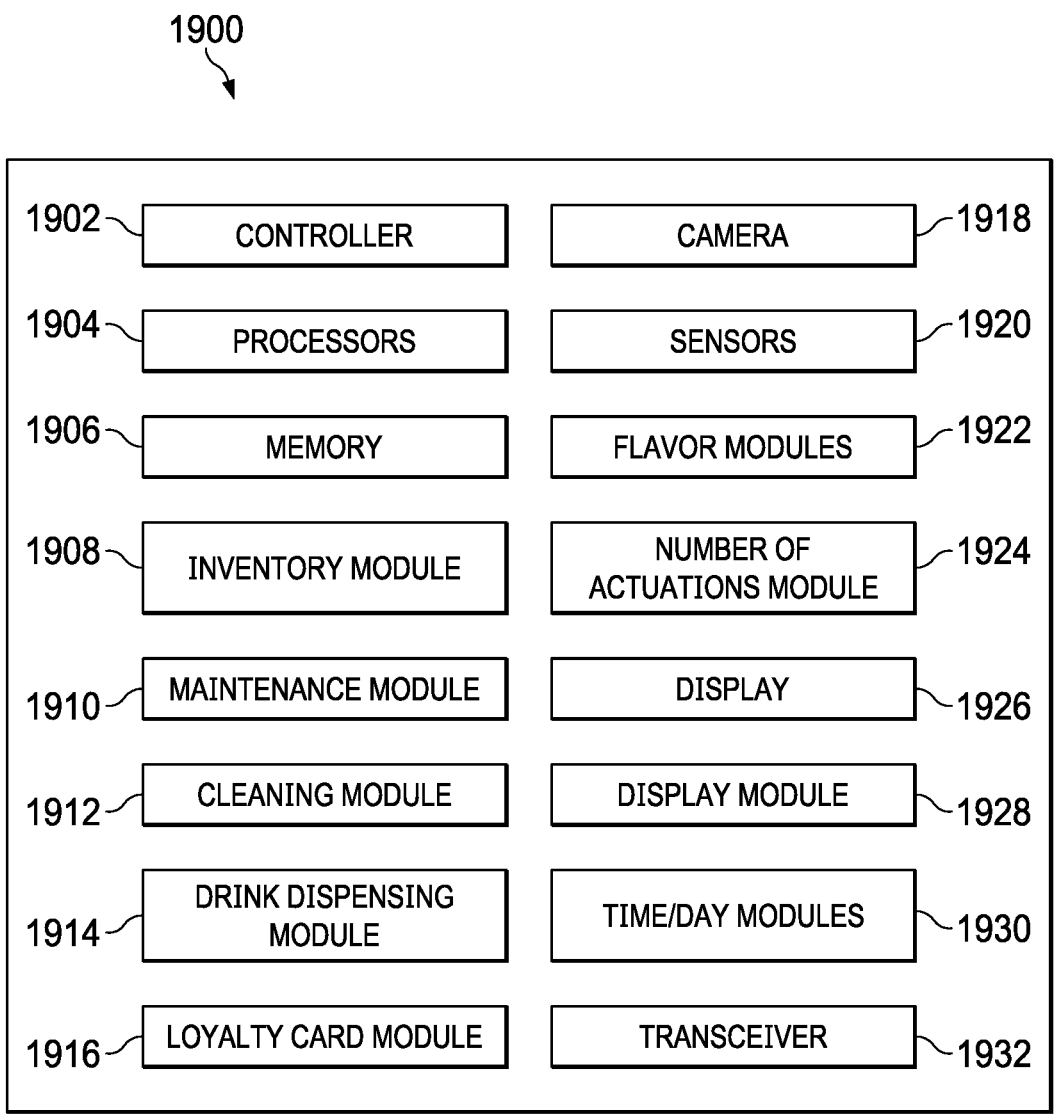
FIG. 19 is a block diagram, according to one embodiment.

In FIG. 19, a block diagram is shown, according to one embodiment. A device 1900 may include a controller 1902, one or more processors 1904, one or more memories 1906, one or more inventory modules 1908, one or more maintenance modules 1910, one or more cleaning modules 1912, one or more drink dispensing modules 1914, one or more loyalty card modules 1916, one or more cameras 1918, one or more sensors 1920, one or more flavor modules 1922, one or more number of actuations modules 1924, one or more displays 1926, one or more display modules 1928, one or more time/day modules 1930, and/or one or more transceivers 1932.

In another example, syrup control and/or management can be enhanced because dumping and/or walk away can be tracked. For example, when a person buys a fountain drink that person may take a slip and if the taste is not correct that person may dump the contents of the container and refill with another flavor. This might indicate that the syrup ratio is out of range and/or another quality control issue. In addition, the person may just walk away and not purchase anything which could be an indication that the syrup ratio is out of range and/or another quality control issue.

In another example, the discrete valve may have a dual head. In one example, the backing block, the CFValve, and the solenoid all have their own outside skin so there is no need to add another. Just use the skin of the CFValve to attach to both. The inlet side of the CFValve can attach to the backing block and the outlet side of the CFValve to the solenoid. In another example, after exiting the metering function at 90 degrees, the flow is directed around the body and out through the center of the outlet housing.

In one example, a dispensing device includes a valve configured to interact with an inlet stream, the inlet stream having a first pressure, the valve having an outlet area with an outlet stream, the outlet stream having a second pressure, and a solenoid which interacts with the outlet stream. In addition, the dispensing device may have: at least one of the inlet stream and the outlet stream being a carbonated water; the first pressure is greater than the second pressure; a size of the solenoid is reduced based on a reduction in pressure from the first pressure to the second pressure; a size of the solenoid is reduced based on the valve; the inlet stream is a utility line; the orifice is fixed; the orifice is adjustable; the orifices are both fixed and adjustable; and the valve is a CF Valve. The CF Valve is a regulating valve for maintaining a substantially constant flow of fluid from a variable pressure fluid supply to a fluid outlet, the CFValve may including one or more of: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending there through from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, the dispensing device may further include: a dispensing unit including one or more flavor units and one or more water units where each of the one or more flavor units include a transportation unit, the transportation unit including a barrier element with one or more openings; a blockage device configured to close the one or more openings to prevent a flow from at least one of the one or more flavor units; and/or a movement device configured to move the blockage device to a first position relative to the one or more openings which allows for a passage of one or more fluid elements and one gaseous elements through the one or more openings in the blockage device.

The dispensing device may further include a carbonated unit. In another example, the movement device is a magnet. In another example, the movement device is an electromagnet. In another example, the dispensing device may have at least one of the one or more flavor units may be selectable. In addition, the at least one of the one or more flavor units may be automatically selectable.

In one embodiment, the cartridge includes: a body with a first groove and a second groove, the body including a body inlet area and a body outlet area; an O-ring coupled to body via the first groove; a throttle pin coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm.

In addition, the cartridge may be configured to be inserted into a device. Further, the cartridge may be configured to be inserted into an existing device where the existing device has one or more inlet ports and outlet ports in any locations on the existing device. In addition, a cartridge inlet area and a cartridge outlet area may be in series with each other. Further, a cartridge inlet area and a cartridge outlet area may be at a 90 degree angle to each other (and/or any other angle and/or any other angle disclosed and/or shown in this document). In addition, the body may include a 360 degree outlet passage. Further, the spring cap may be configured to create a seal by compressing the diaphragm to the body. Further, the cartridge may include a CF Valve.

In another embodiment, a movement system includes: a cartridge with a cartridge inlet area and a cartridge outlet area; a housing with a housing inlet area and a housing outlet area; wherein the cartridge transfers at least one or more gases and one or more liquids from the housing inlet area to the housing outlet area independent of a relative position of the cartridge inlet area to the housing inlet area and the cartridge outlet area to the housing outlet area. In addition, the cartridge may include a body with a first groove, a body inlet area, and a body outlet area. In addition, the cartridge may include an O-ring coupled to body via the first groove. Further, the cartridge may include a throttle pin coupled to the inlet area. In addition, the cartridge may include a spring cap with a groove area, a spring cap inlet area, a spring cap outlet area, and a spring cap O-ring coupled to the spring cap via the groove area. Further, the cartridge may include a spring coupled to a bottom retainer. Further, the cartridge may include a diaphragm coupled to the bottom retainer. In addition, the cartridge may include a top retainer coupled to the diaphragm. In addition, the cartridge may include a CF Valve.

In another embodiment, a cartridge includes: a body with a first groove and a second groove, the body including a body inlet area and a body outlet area; an O-ring coupled to body via the first groove; a throttle pin including a pin and a pinhead coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm. In addition, the at least one of the pin and the pinhead may have a ratio of greater than 1 to the body. Further, the at least one of the pin and the pinhead may have a ratio of less than 1 to the body. In addition, the cartridge may be configured to be inserted into a device. Further, the cartridge may be configured to be inserted into an existing device where the existing device has one or more inlet ports and outlet ports in any locations on the existing device.

In one embodiment, a cleaning system for a drink dispensing device includes: a cleaner canister coupled to a water source; a cleaner CFValve coupled to the water source which provides a first water flow to the cleaner canister. The cleaner canister may provide a cleaner solution to one or more parts of the drink dispensing device.

In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device. In another example, the cleaning system may include a water flush device coupled to the water source and a water flush CFValve coupled to the water source which provides a third water flow to the one or more parts of the drink dispensing device.

In another example, the cleaning system may include an inlet dry breaking fitting and an outlet dry breaking fitting on the sanitizer canister. In another example, the cleaning system may include an inlet dry breaking fitting and an outlet dry breaking fitting on the cleaner canister. In another example, the cleaning system may include a total dissolved solids device which measures an inlet total dissolved solids and an outlet total dissolved solids. In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device. A water flush device coupled to the water source and a water flush CFValve coupled to the water source which provides a third water flow to the one or more parts of the drink dispensing device. A total dissolved solids device which measures an inlet total dissolved solids and an outlet total dissolved solids. In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device; a water flush device coupled to the water source and a water flush CFValve coupled to the water source which provides a third water flow to the one or more parts of the drink dispensing device. A total dissolved solids device which measures an inlet total dissolved solids and an outlet total dissolved solids. An inlet dry breaking fitting and an outlet dry breaking fitting on the sanitizer canister. An inlet dry breaking fitting and an outlet dry breaking fitting on the cleaner canister. A controller that controls one or more ratios based on the inlet total dissolved solids and the outlet total dissolved solids. In another example, one or more of the cleaner CFValve, the sanitizer CFValve, and the water flush CFValve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In another example, one or more of the cleaner CFValve, the sanitizer CFValve, and the water flush CFValve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In one embodiment, a control device may include one or more processors to determine drink dispensing data, a housing with at least one inlet and at least one outlet, the housing containing a control unit and a solenoid, where the control unit maintains a relative constant flow of fluid from a variable pressure fluid supply to a fluid outlet, the control unit including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice.

In another example, the one or more processors transmit the drink dispensing data to a remote device. In another example, the remote device transmits commands to the one or more processors based on the transmitted drink dispensing data. Further, the remote device initiates one or more actions based on the transmitted drink dispensing data. In addition, the one or more actions is at least a product order. In another example, the control device may include an orifice in the housing. In addition, the orifice may be located in the at least one outlet. Further, the orifice may be a fixed orifice or an adjustable orifice. In another example, at least one outlet includes a first outlet and a second outlet. In addition, the solenoid may be located at a dividing section connecting the first outlet and the second outlet. In addition, the solenoid may be located at a combining section connecting the first outlet and the second outlet. In another example, the solenoid may be located downstream of the control unit. In addition, the solenoid may be located upstream of the control unit.

In another embodiment, a drink dispensing device may include one or more processors, a drink dispensing item located above a drink container positioning area, and/or a first sensor configured to determine when a drink container is located in the drink container positioning area where the one or more processors may initiate a drink container filling operation based on a first signal from the first sensor that the drink container is located in the drink container positioning area.

In another example, the one or more processors may discontinue the drink container filling operation based on a second signal from the first sensor that indicates a stoppage of the drink container filling operation. In addition, the first sensor may be positioned at an angle of 20 degrees to the drink positioning area. Further, the drink dispensing device may include including a second sensor positioned at a borderline area of the drink container positioning area. In addition, the drink dispensing device may include a third sensor positioned at a horizontal line of the drink container positioning area. In various examples, the first sensor may be positioned at an angle in the range of 15 degrees to 25 degrees to the drink positioning area.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples. Any combination of any element in this disclosure with any other element in this disclosure is hereby disclosed. For example, an element on page 6 can be combined with any element in this document (e.g., an element from page 20).

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A control device comprising:
   one or more processors configured to determine drink dispensing data including one or more drink formulas;
   a housing with at least one inlet and at least one outlet;
   the housing containing a control unit and a solenoid;
   the control unit is configured to maintain a relative constant flow of fluid from a variable pressure fluid supply to a fluid outlet, the control unit including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice;
   wherein the solenoid is located downstream of the control unit;
   wherein the one or more processors are configured to transmit the drink dispensing data to a remote device, where the drink dispensing data includes temperature data;
   wherein the one or more processors are configured to receive an order, determine a formula for the order, and initiate a flow sequence of two or more elements based on the determined formula via the control unit.

2. The control device of claim 1, wherein the remote device transmits commands to the one or more processors based on the transmitted drink dispensing data.

3. The control device of claim 1, wherein the remote device initiates one or more actions based on the transmitted drink dispensing data.

4. The control device of claim 3, wherein the one or more actions is at least a product order.

5. The control device of claim 1, further including an orifice in the housing.

6. The control device of claim 5, wherein the orifice is located in the at least one outlet.

7. The control device of claim 5, wherein the orifice is a fixed orifice.

8. The control device of claim 5, wherein the orifice is an adjustable orifice.

9. The control device of claim 1, wherein the at least one outlet includes a first outlet and a second outlet.

10. The control device of claim 9, wherein the solenoid is located at a dividing section connecting the first outlet and the second outlet.

11. The control device of claim 9, wherein the solenoid is located at a combining section connecting the first outlet and the second outlet.

* * * * *